US011842517B2

United States Patent
Lyons

(10) Patent No.: US 11,842,517 B2
(45) Date of Patent: Dec. 12, 2023

(54) USING ITERATIVE 3D-MODEL FITTING FOR DOMAIN ADAPTATION OF A HAND-POSE-ESTIMATION NEURAL NETWORK

(71) Applicant: Ultrahaptics IP Ltd, Bristol (GB)

(72) Inventor: Samuel John Llewellyn Lyons, Bristol (GB)

(73) Assignee: ULTRAHAPTICS IP LTD, Bristol (GB)

( * ) Notice: Subject to any disclaimer, the term of this patent is extended or adjusted under 35 U.S.C. 154(b) by 365 days.

(21) Appl. No.: 16/843,281

(22) Filed: Apr. 8, 2020

(65) Prior Publication Data

US 2020/0327418 A1    Oct. 15, 2020

Related U.S. Application Data

(60) Provisional application No. 62/833,085, filed on Apr. 12, 2019.

(51) Int. Cl.
  *G06K 9/62* (2022.01)
  *G06V 20/64* (2022.01)
  (Continued)

(52) U.S. Cl.
  CPC .............. *G06T 7/75* (2017.01); *G06F 18/217* (2023.01); *G06F 18/2111* (2023.01);
  (Continued)

(58) Field of Classification Search
  None
  See application file for complete search history.

(56) References Cited

U.S. PATENT DOCUMENTS 4,218,921 A    8/1980 Berge
4,760,525 A    7/1988 Webb
(Continued)

FOREIGN PATENT DOCUMENTS

CA    2470115 A1    6/2003
CA    2909804 A1    11/2014
(Continued)

OTHER PUBLICATIONS

Azad et al., "Deep domain adaptation under deep label scarcity." arXiv preprint arXiv: 1809.08097 (2018). (Year: 2018).*
(Continued)

*Primary Examiner* — Feng Niu
(74) *Attorney, Agent, or Firm* — Koffsky Schwalb LLC; Mark I. Koffsky

(57) ABSTRACT

Described is a solution for an unlabeled target domain dataset challenge using a domain adaptation technique to train a neural network using an iterative 3D model fitting algorithm to generate refined target domain labels. The neural network supports the convergence of the 3D model fitting algorithm and the 3D model fitting algorithm provides refined labels that are used for training of the neural network. During real-time inference, only the trained neural network is required. A convolutional neural network (CNN) is trained using labeled synthetic frames (source domain) with unlabeled real depth frames (target domain). The CNN initializes an offline iterative 3D model fitting algorithm capable of accurately labeling the hand pose in real depth frames. The labeled real depth frames are used to continue training the CNN thereby improving accuracy beyond that achievable by using only unlabeled real depth frames for domain adaptation.

30 Claims, 7 Drawing Sheets

(51) Int. Cl.
| | | |
|---|---|---|
| *G06T 7/73* | (2017.01) | |
| *G06N 3/084* | (2023.01) | |
| *G06V 40/10* | (2022.01) | |
| *G06F 18/21* | (2023.01) | |
| *G06F 18/2111* | (2023.01) | |
| *G06F 18/214* | (2023.01) | |
| *G06N 3/045* | (2023.01) | |
| *G06V 10/764* | (2022.01) | |
| *G06V 10/82* | (2022.01) | |
| *G06V 10/426* | (2022.01) | |
| *G06V 40/20* | (2022.01) | |
| *G06N 3/126* | (2023.01) | |

(52) U.S. Cl.
CPC ......... *G06F 18/2155* (2023.01); *G06N 3/045* (2023.01); *G06N 3/084* (2013.01); *G06N 3/126* (2013.01); *G06V 10/426* (2022.01); *G06V 10/764* (2022.01); *G06V 10/82* (2022.01); *G06V 20/653* (2022.01); *G06V 40/11* (2022.01); *G06V 40/28* (2022.01); *G06T 2207/10028* (2013.01); *G06T 2207/20081* (2013.01); *G06T 2207/20084* (2013.01)

(56) References Cited

U.S. PATENT DOCUMENTS

| | | |
|---|---|---|
| 4,771,205 A | 9/1988 | Mequio |
| 4,881,212 A | 11/1989 | Takeuchi |
| 5,226,000 A | 7/1993 | Moses |
| 5,235,986 A | 8/1993 | Maslak |
| 5,243,344 A | 9/1993 | Koulopoulos |
| 5,329,682 A | 7/1994 | Thurn |
| 5,371,834 A * | 12/1994 | Tawel ................. G06K 9/6251 706/23 |
| 5,422,431 A | 6/1995 | Ichiki |
| 5,426,388 A | 6/1995 | Flora |
| 5,477,736 A | 12/1995 | Lorraine |
| 5,511,296 A | 4/1996 | Dias |
| 5,729,694 A | 3/1998 | Holzrichter |
| 5,859,915 A | 1/1999 | Norris |
| 6,029,518 A | 2/2000 | Oeftering |
| 6,193,936 B1 | 2/2001 | Gardner |
| 6,216,538 B1 | 4/2001 | Yasuda |
| 6,436,051 B1 | 8/2002 | Morris |
| 6,503,204 B1 | 1/2003 | Sumanaweera |
| 6,647,359 B1 | 11/2003 | Verplank |
| 6,771,294 B1 | 8/2004 | Pulli |
| 6,772,490 B2 | 8/2004 | Toda |
| 6,800,987 B2 | 10/2004 | Toda |
| 7,107,159 B2 | 9/2006 | German |
| 7,109,789 B2 | 9/2006 | Spencer |
| 7,182,726 B2 | 2/2007 | Williams |
| 7,225,404 B1 | 5/2007 | Zilles |
| 7,284,027 B2 | 10/2007 | Jennings, III |
| 7,345,600 B1 | 3/2008 | Fedigan |
| 7,487,662 B2 | 2/2009 | Schabron |
| 7,497,662 B2 | 3/2009 | Mollmann |
| 7,577,260 B1 | 8/2009 | Hooley |
| 7,692,661 B2 | 4/2010 | Cook |
| RE42,192 E | 3/2011 | Schabron |
| 7,966,134 B2 | 6/2011 | German |
| 8,000,481 B2 | 8/2011 | Nishikawa |
| 8,123,502 B2 | 2/2012 | Blakey |
| 8,269,168 B1 | 9/2012 | Axelrod |
| 8,279,193 B1 | 10/2012 | Birnbaum |
| 8,351,646 B2 * | 1/2013 | Fujimura ............... G06T 7/75 382/103 |
| 8,369,973 B2 | 2/2013 | Risbo |
| 8,594,350 B2 | 11/2013 | Hooley |
| 8,607,922 B1 | 12/2013 | Werner |
| 8,782,109 B2 | 7/2014 | Tsutsui |
| 8,823,674 B2 | 9/2014 | Birnbaum et al. |
| 8,833,510 B2 | 9/2014 | Koh |
| 8,884,927 B1 | 11/2014 | Cheatham, III |
| 9,208,664 B1 | 12/2015 | Peters |
| 9,267,735 B2 | 2/2016 | Funayama |
| 9,421,291 B2 | 8/2016 | Robert |
| 9,612,658 B2 | 4/2017 | Subramanian |
| 9,662,680 B2 | 5/2017 | Yamamoto |
| 9,667,173 B1 | 5/2017 | Kappus |
| 9,816,757 B1 | 11/2017 | Zielinski |
| 9,841,819 B2 | 12/2017 | Carter |
| 9,863,699 B2 | 1/2018 | Corbin, III |
| 9,898,089 B2 | 2/2018 | Subramanian |
| 9,945,818 B2 | 4/2018 | Ganti |
| 9,958,943 B2 | 5/2018 | Long |
| 9,977,120 B2 | 5/2018 | Carter |
| 10,101,811 B2 | 10/2018 | Carter |
| 10,101,814 B2 | 10/2018 | Carter |
| 10,133,353 B2 | 11/2018 | Eid |
| 10,140,776 B2 | 11/2018 | Schwarz |
| 10,146,353 B1 | 12/2018 | Smith |
| 10,168,782 B1 | 1/2019 | Tchon |
| 10,268,275 B2 | 4/2019 | Carter |
| 10,281,567 B2 | 5/2019 | Carter |
| 10,318,008 B2 * | 6/2019 | Sinha ................. G06V 40/11 |
| 10,444,842 B2 | 10/2019 | Long |
| 10,469,973 B2 | 11/2019 | Hayashi |
| 10,496,175 B2 | 12/2019 | Long |
| 10,497,358 B2 | 12/2019 | Tester |
| 10,510,357 B2 | 12/2019 | Kovesi |
| 10,520,252 B2 | 12/2019 | Momen |
| 10,523,159 B2 | 12/2019 | Megretski |
| 10,531,212 B2 | 1/2020 | Long |
| 10,535,174 B1 * | 1/2020 | Rigiroli ................. G06N 3/04 |
| 10,569,300 B2 | 2/2020 | Hoshi |
| 10,593,101 B1 * | 3/2020 | Han ..................... G06T 7/55 |
| 10,657,704 B1 * | 5/2020 | Han ..................... G06N 3/08 |
| 10,685,538 B2 | 6/2020 | Carter |
| 10,755,538 B2 | 8/2020 | Carter |
| 10,818,162 B2 | 10/2020 | Carter |
| 10,911,861 B2 | 2/2021 | Buckland |
| 10,915,177 B2 | 2/2021 | Carter |
| 10,921,890 B2 | 2/2021 | Subramanian |
| 10,930,123 B2 | 2/2021 | Carter |
| 10,943,578 B2 | 3/2021 | Long |
| 10,991,074 B2 * | 4/2021 | Bousmalis .......... G06F 18/2155 |
| 11,048,329 B1 | 6/2021 | Lee |
| 11,098,951 B2 | 8/2021 | Kappus |
| 11,113,860 B2 * | 9/2021 | Rigiroli ................. A63F 13/52 |
| 11,169,610 B2 | 11/2021 | Sarafianou |
| 11,189,140 B2 | 11/2021 | Long |
| 11,204,644 B2 | 12/2021 | Long |
| 11,276,281 B2 | 3/2022 | Carter |
| 11,531,395 B2 | 12/2022 | Kappus |
| 11,543,507 B2 | 1/2023 | Carter |
| 11,550,395 B2 | 1/2023 | Beattie |
| 11,550,432 B2 | 1/2023 | Carter |
| 11,553,295 B2 | 1/2023 | Kappus |
| 2001/0007591 A1 | 7/2001 | Pompei |
| 2001/0033124 A1 | 10/2001 | Norris |
| 2002/0149570 A1 | 10/2002 | Knowles |
| 2003/0024317 A1 | 2/2003 | Miller |
| 2003/0144032 A1 | 7/2003 | Brunner |
| 2003/0182647 A1 | 9/2003 | Radeskog |
| 2004/0005715 A1 | 1/2004 | Schabron |
| 2004/0014434 A1 | 1/2004 | Haardt |
| 2004/0052387 A1 | 3/2004 | Norris |
| 2004/0091119 A1 | 5/2004 | Duraiswami |
| 2004/0210158 A1 | 10/2004 | Organ |
| 2004/0226378 A1 | 11/2004 | Oda |
| 2004/0264707 A1 | 12/2004 | Yang |
| 2005/0052714 A1 | 3/2005 | Klug |
| 2005/0056851 A1 | 3/2005 | Althaus |
| 2005/0212760 A1 | 9/2005 | Marvit |
| 2005/0226437 A1 | 10/2005 | Pellegrini |
| 2005/0267695 A1 | 12/2005 | German |
| 2005/0273483 A1 | 12/2005 | Dent |
| 2006/0085049 A1 | 4/2006 | Cory |
| 2006/0090955 A1 | 5/2006 | Cardas |
| 2006/0091301 A1 | 5/2006 | Trisnadi |
| 2006/0164428 A1 | 7/2006 | Cook |

(56) References Cited

U.S. PATENT DOCUMENTS

| | | |
|---|---|---|
| 2007/0036492 A1 | 2/2007 | Lee |
| 2007/0094317 A1 | 4/2007 | Wang |
| 2007/0177681 A1 | 8/2007 | Choi |
| 2007/0214462 A1 | 9/2007 | Boillot |
| 2007/0236450 A1 | 10/2007 | Colgate |
| 2007/0263741 A1 | 11/2007 | Erving |
| 2008/0012647 A1 | 1/2008 | Risbo |
| 2008/0027686 A1 | 1/2008 | Mollmann |
| 2008/0084789 A1 | 4/2008 | Altman |
| 2008/0130906 A1 | 6/2008 | Goldstein |
| 2008/0152191 A1 * | 6/2008 | Fujimura ............ G06V 40/107 382/103 |
| 2008/0226088 A1 | 9/2008 | Aarts |
| 2008/0273723 A1 | 11/2008 | Hartung |
| 2008/0300055 A1 | 12/2008 | Lutnick |
| 2009/0093724 A1 | 4/2009 | Pernot |
| 2009/0116660 A1 | 5/2009 | Croft, III |
| 2009/0232684 A1 | 9/2009 | Hirata |
| 2009/0251421 A1 | 10/2009 | Bloebaum |
| 2009/0319065 A1 | 12/2009 | Risbo |
| 2010/0013613 A1 | 1/2010 | Weston |
| 2010/0016727 A1 | 1/2010 | Rosenberg |
| 2010/0030076 A1 | 2/2010 | Vortman |
| 2010/0044120 A1 | 2/2010 | Richter |
| 2010/0066512 A1 | 3/2010 | Rank |
| 2010/0085168 A1 | 4/2010 | Kyung |
| 2010/0103246 A1 | 4/2010 | Schwerdtner |
| 2010/0109481 A1 | 5/2010 | Buccafusca |
| 2010/0199232 A1 | 8/2010 | Mistry |
| 2010/0231508 A1 | 9/2010 | Cruz-Hernandez |
| 2010/0262008 A1 | 10/2010 | Roundhill |
| 2010/0302015 A1 | 12/2010 | Kipman |
| 2010/0321216 A1 | 12/2010 | Jonsson |
| 2011/0006888 A1 | 1/2011 | Bae |
| 2011/0010958 A1 | 1/2011 | Clark |
| 2011/0051554 A1 | 3/2011 | Varray |
| 2011/0066032 A1 | 3/2011 | Vitek |
| 2011/0199342 A1 | 8/2011 | Vartanian |
| 2011/0310028 A1 | 12/2011 | Camp, Jr. |
| 2012/0057733 A1 | 3/2012 | Morii |
| 2012/0063628 A1 | 3/2012 | Rizzello |
| 2012/0066280 A1 | 3/2012 | Tsutsui |
| 2012/0223880 A1 | 9/2012 | Birnbaum |
| 2012/0229400 A1 | 9/2012 | Birnbaum |
| 2012/0229401 A1 | 9/2012 | Birnbaum |
| 2012/0236689 A1 | 9/2012 | Brown |
| 2012/0243374 A1 | 9/2012 | Dahl |
| 2012/0249409 A1 | 10/2012 | Toney |
| 2012/0249474 A1 | 10/2012 | Pratt |
| 2012/0299853 A1 | 11/2012 | Dagar |
| 2012/0307649 A1 | 12/2012 | Park |
| 2012/0315605 A1 | 12/2012 | Cho |
| 2013/0035582 A1 | 2/2013 | Radulescu |
| 2013/0079621 A1 | 3/2013 | Shoham |
| 2013/0094678 A1 | 4/2013 | Scholte |
| 2013/0100008 A1 | 4/2013 | Marti |
| 2013/0101141 A1 | 4/2013 | Mcelveen |
| 2013/0173658 A1 | 7/2013 | Adelman |
| 2013/0331705 A1 | 12/2013 | Fraser |
| 2014/0027201 A1 | 1/2014 | Islam |
| 2014/0104274 A1 | 4/2014 | Hilliges |
| 2014/0139071 A1 | 5/2014 | Yamamoto |
| 2014/0168091 A1 | 6/2014 | Jones |
| 2014/0201666 A1 | 7/2014 | Bedikian |
| 2014/0204002 A1 | 7/2014 | Bennet |
| 2014/0265572 A1 | 9/2014 | Siedenburg |
| 2014/0267065 A1 | 9/2014 | Levesque |
| 2014/0269207 A1 | 9/2014 | Baym |
| 2014/0269208 A1 | 9/2014 | Baym |
| 2014/0269214 A1 | 9/2014 | Baym |
| 2014/0270305 A1 | 9/2014 | Baym |
| 2014/0320436 A1 | 10/2014 | Modarres |
| 2014/0361988 A1 | 12/2014 | Katz |
| 2014/0369514 A1 | 12/2014 | Baym |
| 2015/0002477 A1 | 1/2015 | Cheatham, III |
| 2015/0005039 A1 | 1/2015 | Liu |
| 2015/0006645 A1 | 1/2015 | Oh |
| 2015/0007025 A1 | 1/2015 | Sassi |
| 2015/0013023 A1 | 1/2015 | Wang |
| 2015/0019299 A1 | 1/2015 | Harvey |
| 2015/0022466 A1 | 1/2015 | Levesque |
| 2015/0029155 A1 | 1/2015 | Lee |
| 2015/0066445 A1 | 3/2015 | Lin |
| 2015/0070147 A1 | 3/2015 | Cruz-Hernandez |
| 2015/0070245 A1 | 3/2015 | Han |
| 2015/0078136 A1 | 3/2015 | Sun |
| 2015/0081110 A1 | 3/2015 | Houston |
| 2015/0084929 A1 | 3/2015 | Lee |
| 2015/0110310 A1 | 4/2015 | Minnaar |
| 2015/0130323 A1 | 5/2015 | Harris |
| 2015/0168205 A1 | 6/2015 | Lee |
| 2015/0192995 A1 | 7/2015 | Subramanian |
| 2015/0220199 A1 | 8/2015 | Wang |
| 2015/0226537 A1 | 8/2015 | Schorre |
| 2015/0226831 A1 | 8/2015 | Nakamura |
| 2015/0241393 A1 | 8/2015 | Ganti |
| 2015/0248787 A1 | 9/2015 | Abovitz |
| 2015/0258431 A1 | 9/2015 | Stafford |
| 2015/0277610 A1 | 10/2015 | Kim |
| 2015/0293592 A1 | 10/2015 | Cheong |
| 2015/0304789 A1 | 10/2015 | Babayoff |
| 2015/0323667 A1 | 11/2015 | Przybyla |
| 2015/0331576 A1 | 11/2015 | Piya |
| 2015/0332075 A1 | 11/2015 | Burch |
| 2016/0019762 A1 | 1/2016 | Levesque |
| 2016/0019879 A1 | 1/2016 | Daley |
| 2016/0026253 A1 | 1/2016 | Bradski |
| 2016/0044417 A1 | 2/2016 | Clemen, Jr. |
| 2016/0124080 A1 | 5/2016 | Carter |
| 2016/0138986 A1 | 5/2016 | Carlin |
| 2016/0175701 A1 | 6/2016 | Froy |
| 2016/0175709 A1 | 6/2016 | Idris |
| 2016/0189702 A1 | 6/2016 | Blanc |
| 2016/0242724 A1 | 8/2016 | Lavallee |
| 2016/0246374 A1 | 8/2016 | Carter |
| 2016/0249150 A1 | 8/2016 | Carter |
| 2016/0291716 A1 | 10/2016 | Boser |
| 2016/0306423 A1 | 10/2016 | Uttermann |
| 2016/0320843 A1 | 11/2016 | Long |
| 2016/0339132 A1 | 11/2016 | Cosman |
| 2016/0374562 A1 | 12/2016 | Vertikov |
| 2017/0002839 A1 | 1/2017 | Bukland |
| 2017/0004819 A1 | 1/2017 | Ochiai |
| 2017/0018171 A1 | 1/2017 | Carter |
| 2017/0024921 A1 | 1/2017 | Beeler |
| 2017/0052148 A1 | 2/2017 | Estevez |
| 2017/0123487 A1 | 5/2017 | Hazra |
| 2017/0123499 A1 | 5/2017 | Eid |
| 2017/0140552 A1 | 5/2017 | Woo |
| 2017/0144190 A1 | 5/2017 | Hoshi |
| 2017/0153707 A1 | 6/2017 | Subramanian |
| 2017/0168586 A1 * | 6/2017 | Sinha ................ G06N 20/00 |
| 2017/0181725 A1 | 6/2017 | Han |
| 2017/0193768 A1 | 7/2017 | Long |
| 2017/0193823 A1 | 7/2017 | Jiang |
| 2017/0211022 A1 | 7/2017 | Reinke |
| 2017/0236506 A1 | 8/2017 | Przybyla |
| 2017/0270356 A1 | 9/2017 | Sills |
| 2017/0279951 A1 | 9/2017 | Hwang |
| 2017/0336860 A1 | 11/2017 | Smoot |
| 2017/0366908 A1 | 12/2017 | Long |
| 2018/0035891 A1 | 2/2018 | Van Soest |
| 2018/0039333 A1 | 2/2018 | Carter |
| 2018/0047259 A1 | 2/2018 | Carter |
| 2018/0074580 A1 | 3/2018 | Hardee |
| 2018/0081439 A1 | 3/2018 | Daniels |
| 2018/0101234 A1 | 4/2018 | Carter |
| 2018/0139557 A1 | 5/2018 | Ochiai |
| 2018/0146306 A1 | 5/2018 | Benattar |
| 2018/0151035 A1 | 5/2018 | Maalouf |
| 2018/0166063 A1 | 6/2018 | Long |
| 2018/0181203 A1 | 6/2018 | Subramanian |
| 2018/0182372 A1 | 6/2018 | Tester |
| 2018/0190007 A1 | 7/2018 | Panteleev |

(56) References Cited

U.S. PATENT DOCUMENTS

| | | |
|---|---|---|
| 2018/0246576 A1 | 8/2018 | Long |
| 2018/0253627 A1* | 9/2018 | Baradel ............... G06V 20/00 |
| 2018/0267156 A1 | 9/2018 | Carter |
| 2018/0304310 A1 | 10/2018 | Long |
| 2018/0309515 A1 | 10/2018 | Murakowski |
| 2018/0310111 A1 | 10/2018 | Kappus |
| 2018/0350339 A1 | 12/2018 | Macours |
| 2018/0361174 A1 | 12/2018 | Radulescu |
| 2019/0038496 A1 | 2/2019 | Levesque |
| 2019/0091565 A1 | 3/2019 | Nelson |
| 2019/0163275 A1 | 5/2019 | Iodice |
| 2019/0175077 A1 | 6/2019 | Zhang |
| 2019/0187244 A1 | 6/2019 | Riccardi |
| 2019/0196578 A1 | 6/2019 | Iodice |
| 2019/0196591 A1 | 6/2019 | Long |
| 2019/0197840 A1 | 6/2019 | Kappus |
| 2019/0197841 A1 | 6/2019 | Carter |
| 2019/0197842 A1 | 6/2019 | Long |
| 2019/0204925 A1 | 7/2019 | Long |
| 2019/0206202 A1 | 7/2019 | Carter |
| 2019/0235628 A1 | 8/2019 | Lacroix |
| 2019/0257932 A1 | 8/2019 | Carter |
| 2019/0310710 A1 | 10/2019 | Deeley |
| 2019/0342654 A1 | 11/2019 | Buckland |
| 2020/0042091 A1 | 2/2020 | Long |
| 2020/0080776 A1 | 3/2020 | Kappus |
| 2020/0082221 A1* | 3/2020 | Tsai ....................... G06T 7/11 |
| 2020/0082804 A1 | 3/2020 | Kappus |
| 2020/0103974 A1 | 4/2020 | Carter |
| 2020/0117229 A1 | 4/2020 | Long |
| 2020/0193269 A1* | 6/2020 | Park ..................... G06F 17/16 |
| 2020/0218354 A1 | 7/2020 | Beattie |
| 2020/0257371 A1 | 8/2020 | Sung |
| 2020/0294299 A1* | 9/2020 | Rigiroli ................. A63F 13/67 |
| 2020/0302760 A1 | 9/2020 | Carter |
| 2020/0320347 A1* | 10/2020 | Nikolenko ........... G06K 9/6257 |
| 2020/0380832 A1 | 12/2020 | Carter |
| 2021/0037332 A1 | 2/2021 | Kappus |
| 2021/0043070 A1 | 2/2021 | Carter |
| 2021/0056693 A1* | 2/2021 | Cheng ................. G06V 10/7753 |
| 2021/0109712 A1 | 4/2021 | Oliver |
| 2021/0111731 A1 | 4/2021 | Oliver |
| 2021/0112353 A1 | 4/2021 | Brian |
| 2021/0141458 A1 | 5/2021 | Sarafianou |
| 2021/0165491 A1 | 6/2021 | Sun |
| 2021/0170447 A1 | 6/2021 | Buckland |
| 2021/0183215 A1 | 6/2021 | Carter |
| 2021/0201884 A1 | 7/2021 | Kappus |
| 2021/0225355 A1 | 7/2021 | Long |
| 2021/0303072 A1 | 9/2021 | Carter |
| 2021/0303758 A1 | 9/2021 | Long |
| 2021/0334706 A1* | 10/2021 | Yamaguchi ........... G06N 3/0454 |
| 2021/0381765 A1 | 12/2021 | Kappus |
| 2021/0397261 A1 | 12/2021 | Kappus |
| 2022/0035479 A1 | 2/2022 | Taylor |
| 2022/0083142 A1 | 3/2022 | Brown |
| 2022/0095068 A1 | 3/2022 | Kappus |
| 2022/0113806 A1 | 4/2022 | Long |
| 2022/0155949 A1 | 5/2022 | Ring |
| 2022/0198892 A1 | 6/2022 | Carter |
| 2022/0236806 A1 | 7/2022 | Carter |
| 2022/0252550 A1 | 8/2022 | Catsis |
| 2022/0300028 A1 | 9/2022 | Long et al. |
| 2022/0300070 A1 | 9/2022 | Iodice et al. |
| 2022/0329250 A1 | 10/2022 | Long |
| 2022/0393095 A1 | 12/2022 | Chilles |
| 2023/0036123 A1 | 2/2023 | Long |
| 2023/0075917 A1 | 3/2023 | Pittera |
| 2023/0117919 A1 | 4/2023 | Iodice |
| 2023/0124704 A1 | 4/2023 | Rorke |
| 2023/0141896 A1* | 5/2023 | Liu ....................... A61B 3/0025 351/246 |

FOREIGN PATENT DOCUMENTS

| | | |
|---|---|---|
| CN | 101986787 | 3/2011 |
| CN | 102459900 | 5/2012 |
| CN | 102591512 | 7/2012 |
| CN | 103797379 | 5/2014 |
| CN | 103984414 A | 8/2014 |
| CN | 107340871 A | 11/2017 |
| CN | 107407969 A | 11/2017 |
| CN | 107534810 A | 1/2018 |
| EP | 0057594 A2 | 8/1982 |
| EP | 309003 | 3/1989 |
| EP | 0696670 A1 | 2/1996 |
| EP | 1875081 A1 | 1/2008 |
| EP | 1911530 | 4/2008 |
| EP | 2271129 A1 | 1/2011 |
| EP | 1461598 B1 | 4/2014 |
| EP | 3207817 A1 | 8/2017 |
| EP | 3216231 B1 | 8/2019 |
| EP | 3916525 | 12/2021 |
| GB | 2464117 | 4/2010 |
| GB | 2513884 | 11/2014 |
| GB | 2513884 A | 11/2014 |
| GB | 2530036 | 3/2016 |
| JP | 2008074075 | 4/2008 |
| JP | 2010109579 | 5/2010 |
| JP | 2011172074 | 9/2011 |
| JP | 2012048378 | 3/2012 |
| JP | 2012048378 A | 3/2012 |
| JP | 5477736 B2 | 4/2014 |
| JP | 2015035657 A | 2/2015 |
| JP | 2016035646 | 3/2016 |
| JP | 2017168086 | 9/2017 |
| JP | 6239796 | 11/2017 |
| KR | 20120065779 | 6/2012 |
| KR | 20130055972 | 5/2013 |
| KR | 1020130055972 | 5/2013 |
| KR | 20160008280 | 1/2016 |
| KR | 20200082449 A | 7/2020 |
| WO | 9118486 | 11/1991 |
| WO | 9639754 | 12/1996 |
| WO | 03050511 A | 6/2003 |
| WO | 2005017965 | 2/2005 |
| WO | 2007144801 A2 | 12/2007 |
| WO | 2009071746 A1 | 6/2009 |
| WO | 2009112866 | 9/2009 |
| WO | 2010003836 | 1/2010 |
| WO | 2010139916 | 12/2010 |
| WO | 2011132012 A1 | 10/2011 |
| WO | 2012023864 | 2/2012 |
| WO | 2012104648 A1 | 8/2012 |
| WO | 2013179179 | 12/2013 |
| WO | 2014181084 | 11/2014 |
| WO | 2014181084 A1 | 11/2014 |
| WO | 2015006467 | 1/2015 |
| WO | 2015039622 | 3/2015 |
| WO | 2015127335 | 8/2015 |
| WO | 2015194510 | 12/2015 |
| WO | 2016007920 | 1/2016 |
| WO | 2016073936 | 5/2016 |
| WO | 2016095033 A1 | 6/2016 |
| WO | 2016099279 | 6/2016 |
| WO | 2016132141 | 8/2016 |
| WO | 2016132144 | 8/2016 |
| WO | 2016137675 | 9/2016 |
| WO | 2016162058 | 10/2016 |
| WO | 2017172006 | 10/2017 |
| WO | 2018109466 A1 | 6/2018 |
| WO | 2020049321 A2 | 3/2020 |
| WO | 2021130505 A1 | 7/2021 |
| WO | 2021260373 A1 | 12/2021 |

OTHER PUBLICATIONS

Wang et al., "Few-shot adaptive faster r-cnn." In Proceedings of the IEEE/CVF Conference on Computer Vision and Pattern Recognition, pp. 7173-7182. 2019. (Year: 2019).*

(56) References Cited

OTHER PUBLICATIONS

Der et al., "Inverse kinematics for reduced deformable models." ACM Transactions on graphics (TOG) 25, No. 3 (2006): 1174-1179. (Year: 2006).*
Seo et al., "Improved numerical inverse kinematics for human pose estimation," Opt. Eng. 50(3) 037001 (Mar. 1, 2011) https://doi.org/10.1117/1.3549255 (Year: 2011).*
Boureau et al., "A theoretical analysis of feature pooling in visual recognition." In Proceedings of the 27th international conference on machine learning (ICML-10), pp. 111-118. 2010. (Year: 2010).*
Duka, "Neural network based inverse kinematics solution for trajectory tracking of a robotic arm." Procedia Technology 12 (2014): 20-27. (Year: 2014).*
Almusawi et al., "A new artificial neural network approach in solving inverse kinematics of robotic arm (denso vp6242)." Computational intelligence and neuroscience 2016 (2016). (Year: 2016).*
Oikonomidis et al., "Efficient model-based 3D tracking of hand articulations using Kinect." In BmVC, vol. 1, No. 2, p. 3. 2011. (Year: 2011).*
Al-Mashhadany, "Inverse Kinematics Problem (IKP) of 6-DOF Manipulator By Locally Recurrent Neural Networks (LRNNs)," Management and Service Science (MASS), International Conference on Management and Service Science., IEEE, Aug. 24, 2010, 5 pages. (Year: 2010).*
Guez, "Solution to the inverse kinematic problem in robotics by neural networks." In Proceedings of the 2nd International Conference on Neural Networks, 1988. San Diego, California. (Year: 1988).*
Mahboob, "Artificial neural networks for learning inverse kinematics of humanoid robot arms." MS Thesis, 2015. (Year: 2015).*
Oyama et al., "Inverse kinematics learning for robotic arms with fewer degrees of freedom by modular neural network systems," 2005 IEEE/RSJ International Conference on Intelligent Robots and Systems, Edmonton, Alta., 2005, pp. 1791-1798, doi: 10.1109/IROS.2005.1545084. (Year: 2005).*
Montenegro et al., "Neural Network as an Alternative to the Jacobian for Iterative Solution to Inverse Kinematics," 2018 Latin American Robotic Symposium, 2018 Brazilian Symposium on Robotics (SBR) and 2018 Workshop on Robotics in Education (WRE), João Pessoa, Brazil, 2018, pp. 333-338 (Year: 2018).*
Cappellari et al., "Identifying Electromyography Sensor Placement using Dense Neural Networks." In DATA, pp. 130-141. 2018. (Year: 2018).*
Anonymous: "How does Ultrahaptics technology work?—Ultrahaptics Developer Information", Jul. 31, 2018 (Jul. 31, 2018), XP055839320, Retrieved from the Internet: URL:https://developer.ultrahaptics.com/knowledgebase/haptics-overview/ [retrieved on Sep. 8, 2021].
Corrected Notice of Allowability dated Nov. 24, 2021 for U.S. Appl. No. 16/600,500 (pp. 1-5).
EPO 21186570.4 Extended Search Report dated Oct. 29, 2021.
EPO Application 18 725 358.8 Examination Report dated Sep. 22, 2021.
EPO Examination Search Report 17 702 910.5 (dated Jun. 23, 2021).
International Search Report and Written Opinion for App. No. PCT/GB2021/051590, dated Nov. 11, 2021, 20 pages.
Notice of Allowance dated Nov. 5, 2021 for U.S. Appl. No. 16/899,720 (pp. 1-9).
Office Action (Non-Final Rejection) dated Dec. 20, 2021 for U.S. Appl. No. 17/195,795 (pp. 1-7).
Office Action (Notice of Allowance and Fees Due (PTOL-85)) dated Dec. 14, 2021 for U.S. Appl. No. 17/170,841 (pp. 1-8).
Office Action dated Oct. 29, 2021 for U.S. Appl. No. 16/198,959 (pp. 1-7).
Office Action dated Mar. 31, 2021 for U.S. Appl. No. 16/228,760 (pp. 1-21).
ISR and WO for PCT/GB2020/052544 (Dec. 18, 2020) (14 pages).
ISR & WO for PCT/GB2020/052545 (Jan. 27, 2021) 14 pages.
Notice of Allowance dated Apr. 20, 2021 for U.S. Appl. No. 16/563,608 (pp. 1-5).
Hoshi et al., Tactile Presentation by Airborne Ultrasonic Oscillator Array, Proceedings of Robotics and Mechatronics Lecture 2009, Japan Society of Mechanical Engineers; May 24, 2009 (5 pages).
Office Action dated May 14, 2021 for U.S. Appl. No. 16/198,959 (pp. 1-6).
Office Action dated May 13, 2021 for U.S. Appl. No. 16/600,500 (pp. 1-9).
ISR for PCT/GB2020/053373 (Mar. 26, 2021) (16 pages).
ISR for PCT/GB2020/052546 (Feb. 23, 2021) (14 pages).
Brian Kappus and Ben Long, Spatiotemporal Modulation for Mid-Air Haptic Feedback from an Ultrasonic Phased Array, ICSV25, Hiroshima, Jul. 8-12, 2018, 6 pages.
Notice of Allowance dated Jun. 10, 2021 for U.S. Appl. No. 17/092,333 (pp. 1-9).
Notice of Allowance dated Jun. 25, 2021 for U.S. Appl. No. 15/396,851 (pp. 1-10).
Office Action dated Jun. 25, 2021 for U.S. Appl. No. 16/899,720 (pp. 1-5).
A. B. Vallbo, Receptive field characteristics of tactile units with myelinated afferents in hairy skin of human subjects, Journal of Physiology (1995), 483.3, pp. 783-795.
Amanda Zimmerman, The gentle touch receptors of mammalian skin, Science, Nov. 21, 2014, vol. 346 Issue 6212, p. 950.
Corrected Notice of Allowability dated Aug. 9, 2021 for U.S. Appl. No. 15/396,851 (pp. 1-6).
Henrik Bruus, Acoustofluidics 2: Perturbation theory and ultrasound resonance modes, Lab Chip, 2012, 12, 20-28.
Hyunjae Gil, Whiskers: Exploring the Use of Ultrasonic Haptic Cues on the Face, CHI 2018, Apr. 21-26, 2018, Montréal, QC, Canada.
India Morrison, The skin as a social organ, Exp Brain Res (2010) 204:305-314.
Jonaschatel-Goldman, Touch increases autonomic coupling between romantic partners, Frontiers in Behavioral Neuroscience Mar. 2014, vol. 8, Article 95.
Kai Tsumoto, Presentation of Tactile Pleasantness Using Airborne Ultrasound, 2021 IEEE World Haptics Conference (WHC) Jul. 6-9, 2021. Montreal, Canada.
Keisuke Hasegawa, Electronically steerable ultrasound-driven long narrow air stream, Applied Physics Letters 111, 064104 (2017).
Keisuke Hasegawa, Midair Ultrasound Fragrance Rendering, IEEE Transactions on Visualization and Computer Graphics, vol. 24, No. 4, Apr. 2018 1477.
Keisuke Hasegawa,,Curved acceleration path of ultrasound-driven air flow, J. Appl. Phys. 125, 054902 (2019).
Line S Loken, Coding of pleasant touch by unmyelinated afferents in humans, Nature Neuroscience vol. 12 [ No. 5 [ May 2009 547.
Mariana von Mohr, The soothing function of touch: affective touch reduces feelings of social exclusion, Scientific Reports, 7: 13516, Oct. 18, 2017.
Mitsuru Nakajima, Remotely Displaying Cooling Sensation via Ultrasound-Driven Air Flow, Haptics Symposium 2018, San Francisco, USA p. 340.
Mohamed Yacine Tsalamlal, Affective Communication through Air Jet Stimulation: Evidence from Event-Related Potentials, International Journal of Human-Computer Interaction 2018.
Notice of Allowance dated Jul. 22, 2021 for U.S. Appl. No. 16/600,500 (pp. 1-9).
Office Action dated Aug. 10, 2021 for U.S. Appl. No. 16/564,016 (pp. 1-14).
Office Action dated Aug. 19, 2021 for U.S. Appl. No. 17/170,841 (pp. 1-9).
Office Action dated Aug. 9, 2021 for U.S. Appl. No. 17/068,825 (pp. 1-9).
Office Action dated Sep. 16, 2021 for U.S. Appl. No. 16/600,496 (pp. 1-8).
Office Action dated Sep. 24, 2021 for U.S. Appl. No. 17/080,840 (pp. 1-9).
Rochelle Ackerley, Human C-Tactile Afferents are Tuned to the Temperature of a Skin-Stroking Caress, J. Neurosci., Feb. 19, 2014, 34(8):2879-2883.

(56) References Cited

OTHER PUBLICATIONS

Ryoko Takahashi, Tactile Stimulation by Repetitive Lateral Movement of Midair Ultrasound Focus, Journal of Latex Class Files, vol. 14, No. 8, Aug. 2015.
Stanley J. Bolanowski, Hairy Skin: Psychophysical Channels and Their Physiological Substrates, Somatosensory and Motor Research, vol. 11. No. 3, 1994, pp. 279-290.
Stefan G. Lechner, Hairy Sensation, Physiology 28: 142-150, 2013.
Supplemental Notice of Allowability dated Jul. 28, 2021 for U.S. Appl. No. 16/563,608 (pp. 1-2).
Supplemental Notice of Allowability dated Jul. 28, 2021 for U.S. Appl. No. 17/092,333 (pp. 1-2).
Takaaki Kamigaki, Noncontact Thermal and Vibrotactile Display Using Focused Airborne Ultrasound, EuroHaptics 2020, LNCS 12272, pp. 271-278, 2020.
Tomoo Kamakura, Acoustic streaming induced in focused Gaussian beams, J. Acoust. Soc. Am. 97 (5), Pt. 1, May 1995 p. 2740.
Uta Sailer, How Sensory and Affective Attributes Describe Touch Targeting C-Tactile Fibers, Experimental Psychology (2020), 67(4), 224-236.
E.S. Ebbini et al. (1991), A spherical-section ultrasound phased array applicator for deep localized hyperthermia, Biomedical Engineering, IEEE Transactions on (vol. 38 Issue: 7), pp. 634-643.
Gavrilov, L.R. (2008) "The Possibility of Generating Focal Regions of Complex Configurations in Application to the Problems of Stimulation of Human Receptor Structures by Focused Ultrasound" Acoustical Physics, vol. 54, No. 2, pp. 269-278.
Mingzhu Lu et al. (2006) Design and experiment of 256-element ultrasound phased array for noninvasive focused ultrasound surgery, Ultrasonics, vol. 44, Supplement, Dec. 22, 2006, pp. e325-e330.
Gavrilov L R et al. (2000) "A theoretical assessment of the relative performance of spherical phased arrays for ultrasound surgery" Ultrasonics, Ferroelectrics, and Frequency Control, IEEE Transactions on (vol. 47, Issue: 1), pp. 125-139.
Pompei, F.J. (2002), "Sound from Ultrasound: The Parametric Array as an Audible Sound Source", Massachusetts Institute of Technology (132 pages).
Hasegawa, K. and Shinoda, H. (2013) "Aerial Display of Vibrotactile Sensation with High Spatial-Temporal Resolution using Large Aperture Airbourne Ultrasound Phased Array", University of Tokyo (6 pages).
Hoshi T et al., "Noncontact Tactile Display Based on Radiation Pressure of Airborne Ultrasound", IEEE Transactions on Haptics, IEEE, USA, (Jul. 1, 2010), vol. 3, No. 3, ISSN 1939-1412, pp. 155-165.
Yoshino, K. and Shinoda, H. (2013), "Visio Acoustic Screen for Contactless Touch Interface with Tactile Sensation", University of Tokyo (5 pages).
Kamakura, T. and Aoki, K. (2006) "A Highly Directional Audio System using a Parametric Array in Air" WESPAC IX 2006 (8 pages).
Alexander, J et al. (2011), Adding Haptic Feedback to Mobile TV (6 pages).
Tom Carter et al., "UltraHaptics: Multi-Point Mid-Air Haptic Feedback for Touch Surfaces", Proceedings of the 26th Annual ACM Symposium on User Interface Software and Technology, UIST '13, New York, New York, USA, (Jan. 1, 2013), ISBN 978-1-45-032268-3, pp. 505-514.
Search Report for GB1308274.8 dated Nov. 11, 2013. (2 pages).
Iwamoto T et al., "Two-dimensional Scanning Tactile Display using Ultrasound Radiation Pressure", Haptic Interfaces for Virtual Environment and Teleoperator Systems, 20 06 14th Symposium on Alexandria, Va, USA Mar. 25-26, 2006, Piscataway, NJ, USA,IEEE, (Mar. 25, 2006), ISBN 978-1-4244-0226-7, pp. 57-61.
Iwamoto et al. (2008), Non-contact Method for Producing Tactile Sensation Using Airborne Ultrasound, EuroHaptics, pp. 504-513.
Search report for PCT/GB2015/052578 dated Oct. 26, 2015 (12 pages).

Marzo et al., Holographic acoustic elements for manipulation of levitated objects, Nature Communications Doi: 10.1038/ncomms9661 (2015) (7 pages).
Search report for PCT/GB2014/051319 dated Dec. 8, 2014 (4 pages).
Search Report for GB1415923.0 dated Mar. 11, 2015. (1 page).
Marshall, M ., Carter, T., Alexander, J., & Subramanian, S. (2012). Ultratangibles: creating movable tangible objects on interactive tables. In Proceedings of the 2012 ACM annual conference on Human Factors in Computing Systems, (pp. 2185-2188).
Obrist et al., Talking about Tactile Experiences, CHI 2013, Apr. 27-May 2, 2013 (10 pages).
Benjamin Long et al., "Rendering volumetric haptic shapes in mid-air using ultrasound", ACM Transactions on Graphics (TOG), ACM, US, (Nov. 19, 2014), vol. 33, No. 6, ISSN 0730-0301, pp. 1-10.
Freeman et al., Tactile Feedback for Above-Device Gesture Interfaces: Adding Touch to Touchless Interactions ICMI'14, Nov. 12-16, 2014, Istanbul, Turkey (8 pages).
Obrist et al., Emotions Mediated Through Mid-Air Haptics, CHI 2015, Apr. 18-23, 2015, Seoul, Republic of Korea. (10 pages).
Wilson et al., Perception of Ultrasonic Haptic Feedback on the Hand: Localisation and Apparent Motion, CHI 2014, Apr. 26-May 1, 2014, Toronto, Ontario, Canada. (10 pages).
Phys.org, Touchable Hologram Becomes Reality, Aug. 6, 2009, by Lisa Zyga (2 pages).
Iwamoto et al., Airborne Ultrasound Tactile Display: Supplement, The University of Tokyo 2008 (2 pages).
Hoshi, T., Development of Aerial-Input and Aerial-Tactile-Feedback System, IEEE World Haptics Conference 2011, p. 569-573.
EPSRC Grant summary EP/J004448/1 (2011) (1 page).
Hoshi, T., Handwriting Transmission System Using Noncontact Tactile Display, IEEE Haptics Symposium 2012 pp. 399-401.
Takahashi, M. et al., Large Aperture Airborne Ultrasound Tactile Display Using Distributed Array Units, SICE Annual Conference 2010 p. 359-62.
Hoshi, T., Non-contact Tactile Sensation Synthesized by Ultrasound Transducers, Third Joint Euro haptics Conference and Symposium on Haptic Interfaces for Virtual Environment and Teleoperator Systems 2009 (5 pages).
Tom Nelligan and Dan Kass, Intro to Ultrasonic Phased Array (date unknown) (8 pages).
Light, E.D., Progress in Two Dimensional Arrays for Real Time Volumetric Imaging, 1998 (17 pages).
Casper et al., Realtime Control of Multiple-focus Phased Array Heating Patterns Based on Noninvasive Ultrasound Thermography, IEEE Trans Biomed Eng. Jan. 2012; 59(1): 95-105.
Hoshi, T., Touchable Holography, SIGGRAPH 2009, New Orleans, Louisiana, Aug. 3-7, 2009. (1 page).
Sylvia Gebhardt, Ultrasonic Transducer Arrays for Particle Manipulation (date unknown) (2 pages).
Search report and Written Opinion of ISA for PCT/GB2015/050417 dated Jul. 8, 2016 (20 pages).
Search report and Written Opinion of ISA for PCT/GB2015/050421 dated Jul. 8, 2016 (15 pages).
Search report and Written Opinion of ISA for PCT/GB2017/050012 dated Jun. 8, 2017. (18 pages).
Oscar Martínez-Graullera et al., "2D array design based on Fermat spiral for ultrasound imaging", Ultrasonics, (Feb. 1, 2010), vol. 50, No. 2, ISSN 0041-624X, pp. 280-289, XP055210119.
Search Report for PCT/GB2017/052332 dated Oct. 10, 2017 (12 pages).
Canada Application 2,909,804 Office Action dated Oct. 18, 2019, 4 pages.
A. Sand, Head-Mounted Display with Mid-Air Tactile Feedback, Proceedings of the 21st ACM Symposium on Virtual Reality Software and Technology, Nov. 13-15, 2015 (8 pages).
E. Bok, Metasurface for Water-to-Air Sound Transmission, Physical Review Letters 120, 044302 (2018) (6 pages).
K. Jia, Dynamic properties of micro-particles in ultrasonic transportation using phase-controlled standing waves, J. Applied Physics 116, n. 16 (2014) (12 pages).

(56) References Cited

OTHER PUBLICATIONS

Marco A B Andrade et al., "Matrix method for acoustic levitation simulation", IEEE Transactions on Ultrasonics, Ferroelectrics and Frequency Control, IEEE, US, (Aug. 1, 2011), vol. 58, No. 8, ISSN 0885-3010, pp. 1674-1683.
M. Barmatz et al., "Acoustic radiation potential on a sphere in plane, cylindrical, and spherical standing wave fields", The Journal of the Acoustical Society of America, New York, NY, US, (Mar. 1, 1985), vol. 77, No. 3, pp. 928-945, XP055389249.
M. Toda, New Type of Matching Layer for Air-Coupled Ultrasonic Transducers, IEEE Transactions on Ultrasonics, Ferroelecthcs, and Frequency Control, vol. 49, No. 7, Jul. 2002 (8 pages).
Search Report for PCT/GB/2017/053729 dated Mar. 15, 2018 (16 pages).
Search Report for PCT/GB/2017/053880 dated Mar. 21, 2018. (13 pages).
Xin Cheng et al., "Computation of the acoustic radiation force on a sphere based on the 3-D FDTD method", Piezoelectricity, Acoustic Waves and Device Applications (SPAWDA), 2010 Symposium On, IEEE, (Dec. 10, 2010), ISBN 978-1-4244-9822-2, pp. 236-239.
Yang Ling et al., "Phase-coded approach for controllable generation of acoustical vortices", Journal of Applied Physics, American Institute of Physics, US, vol. 113, No. 15, ISSN 0021-8979, (Apr. 21, 2013), p. 154904-154904.
International Preliminary Report on Patentability and Written Opinion issued in corresponding PCT/ US2017/035009, dated Dec. 4, 2018, 8 pages.
"Welcome to Project Soli" video, https://atap.google.com/#project-soli Accessed Nov. 30, 2018, 2 pages.
Colgan, A., "How Does the Leap Motion Controller Work?" Leap Motion, Aug. 9, 2014, 10 pages.
Corrected Notice of Allowability dated Jun. 21, 2019 for U.S. Appl. No. 15/966,213 (2 pages).
Damn Geeky, "Virtual projection keyboard technology with haptic feedback on palm of your hand," May 30, 2013, 4 pages.
Definition of "Interferometry"according to Wikipedia, 25 pages., Retrieved Nov. 2018.
Definition of "Multilateration" according to Wikipedia, 7 pages., Retrieved Nov. 2018.
Definition of "Trilateration"according to Wikipedia, 2 pages., Retrieved Nov. 2018.
EPO Office Action for EP16708440.9 dated Sep. 12, 2018 (7 pages).
Ex Parte Quayle Action dated Dec. 28, 2018 for U.S. Appl. No. 15/966,213 (pp. 1-7).
Gokturk, et al., "A Time-of-Flight Depth Sensor-System Description, Issues and Solutions," Published in: 2004 Conference on Computer Vision and Pattern Recognition Workshop, Date of Conference: Jun. 27-Jul. 2, 2004, 9 pages.
Iddan, et al., "3D Imaging in the Studio (And Elsewhwere . . . " Apr. 2001, 3DV systems Ltd., Yokneam, Isreal, www.3dvsystems.com.il, 9 pages.
International Preliminary Report on Patentability for Application No. PCT/EP2017/069569 dated Feb. 5, 2019, 11 pages.
International Search Report and Written Opinion for Application No. PCT/GB2018/053739, dated Jun. 4, 2019, 16 pages.
Japanese Office Action (with English language translation) for Application No. 2017-514569, dated Mar. 31, 3019, 10 pages.
Kolb, et al., "Time-of-Flight Cameras in Computer Graphics," Computer Graphics forum, vol. 29 (2010), No. 1, pp. 141-159.
Krim, et al., "Two Decades of Array Signal Processing Research—The Parametric Approach", IEEE Signal Processing Magazine, Jul. 1996, pp. 67-94.
Lang, Robert, "3D Time-of-Flight Distance Measurement with Custom Solid-State Image Sensors in CMOS/CCD—Technology", A dissertation submitted to Department of EE and CS at Univ. of Siegen, dated Jun. 28, 2000, 223 pages.
Li, Larry, "Time-of-Flight Camera—An Introduction," Texas Instruments, Technical White Paper, SLOA190B—Jan. 2014 Revised May 2014, 10 pages.

Meijster, A., et al., "A General Algorithm for Computing Distance Transforms in Linear Time," Mathematical Morphology and its Applications to Image and Signal Processing, 2002, pp. 331-340.
Notice of Allowance dated Dec. 19, 2018 for U.S. Appl. No. 15/665,629 (pp. 1-9).
Notice of Allowance dated Dec. 21, 2018 for U.S. Appl. No. 15/983,864 (pp. 1-7).
Notice of Allowance dated Feb. 7, 2019 for U.S. Appl. No. 15/851,214 (pp. 1-7).
Notice of Allowance dated Jul. 31, 2019 for U.S. Appl. No. 15/851,214 (pp. 1-9).
Notice of Allowance dated Jul. 31, 2019 for U.S. Appl. No. 16/296,127 (pp. 1-9).
Notice of Allowance dated May 30, 2019 for U.S. Appl. No. 15/966,213 (pp. 1-9).
Office Action dated Apr. 18, 2019 for U.S. Appl. No. 16/296,127 (pags 1-6).
Office Action dated Apr. 4, 2019 for U.S. Appl. No. 15/897,804 (pp. 1-10).
Office Action dated Feb. 20, 2019 for U.S. Appl. No. 15/623,516 (pp. 1-8).
Office Action dated Jul. 10, 2019 for U.S. Appl. No. 15/210,661 (pp. 1-12).
Office Action dated Jul. 26, 2019 for U.S. Appl. No. 16/159,695 (pp. 1-8).
Office Action dated May 16, 2019 for U.S. Appl. No. 15/396,851 (pp. 1-7).
PCT Partial International Search Report for Application No. PCT/GB2018/053404 dated Feb. 25, 2019, 13 pages.
Péter Tamás Kovács et al., "Tangible Holographic 3D Objects with Virtual Touch", Interactive Tabletops & Surfaces, ACM, 2 Penn Plaza, Suite 701 New York NY 10121-0701 USA, (Nov. 15, 2015), ISBN 978-1-4503-3899-8, pp. 319-324.
Schmidt, Ralph, "Multiple Emitter Location and Signal Parameter Estimation" IEEE Transactions of Antenna and Propagation, vol. AP-34, No. 3, Mar. 1986, pp. 276-280.
Search report for PCT/GB2018/051061 dated Sep. 26, 2018 (17 pages).
Search report for PCT/US2018/028966 dated Jul. 13, 2018 (43 pages).
Sixth Sense webpage, http://www.pranavmistry.com/projects/sixthsense/ Accessed Nov. 30, 2018, 7 pages.
Steve Guest et al., "Audiotactile interactions in roughness perception", Exp. Brain Res (2002) 146:161-171, DOI 10.1007/s00221-002-1164-z, Accepted: May 16, 2002/ Published online: Jul. 26, 2002, Springer-Verlag 2002, (11 pages).
Takahashi Dean: "Ultrahaptics shows off sense of touch in virtual reality", Dec. 10, 2016 (Dec. 10, 2016), XP055556416, Retrieved from the Internet: URL: https://venturebeat.com/2016/12/10/ultrahaptics-shows-off-sense-of-touch-in-virtual-reality/ [retrieved on Feb. 13, 2019] 4 pages.
Teixeira, et al., "A brief introduction to Microsoft's Kinect Sensor," Kinect, 26 pages., retrieved Nov. 2018.
Xu Hongyi et al., "6-DoF Haptic Rendering Using Continuous Collision Detection between Points and Signed Distance Fields", IEEE Transactions On Haptics, IEEE, USA, vol. 10, No. 2, ISSN 1939-1412, (Sep. 27, 2016), pp. 151-161, (Jun. 16, 2017).
Zeng, Wejun, "Microsoft Kinect Sensor and Its Effect," IEEE Multimedia, Apr.-Jun. 2012, 7 pages.
Office Action dated Aug. 22, 2019 for U.S. Appl. No. 16/160,862 (pp. 1-5).
International Search Report and Written Opinion for Application No. PCT/GB2019/050969, dated Jun. 13, 2019, 15 pages.
Extended European Search Report for Application No. EP19169929.7, dated Aug. 6, 2019, 7 pages.
Office Action dated Oct. 7, 2019 for U.S. Appl. No. 15/396,851 (pp. 1-9).
Office Action dated Oct. 17, 2019 for U.S. Appl. No. 15/897,804 (pp. 1-10).
Corrected Notice of Allowability dated Oct. 31, 2019 for U.S. Appl. No. 15/623,516 (pp. 1-2).
Office Action dated Oct. 31, 2019 for U.S. Appl. No. 15/671,107 (pp. 1-6).

(56) References Cited

OTHER PUBLICATIONS

Office Action dated Mar. 20, 2020 for U.S. Appl. No. 15/210,661 (pp. 1-10).
European Office Action for Application No. EP16750992.6, dated Oct. 2, 2019, 3 pages.
Office Action dated Dec. 11, 2019 for U.S. Appl. No. 15/959,266 (pp. 1-15).
Jager et al., "Air-Coupled 40-KHZ Ultrasonic 2D-Phased Array Based on a 3D-Printed Waveguide Structure", 2017 IEEE, 4 pages.
Wooh et al., "Optimum beam steering of linear phased arays," Wave Motion 29 (1999) pp. 245-265, 21 pages.
Notice of Allowance dated Feb. 10, 2020, for U.S. Appl. No. 16/160,862 (pp. 1-9).
Office Action dated Feb. 25, 2020 for U.S. Appl. No. 15/960,113 (pp. 1-7).
Office Action dated Feb. 7, 2020 for U.S. Appl. No. 16/159,695 (pp. 1-8).
Office Action dated Jan. 29, 2020 for U.S. Appl. No. 16/198,959 (p. 1-6).
Office Action dated Jan. 10, 2020 for U.S. Appl. No. 16/228,767 (pp. 1-6).
Yaroslav Ganin et al., Domain-Adversarial Training of Neural Networks, Journal of Machine Learning Research 17 (2016) 1-35, submitted May 2015; published Apr. 2016.
Yaroslav Ganin et al., Unsupervised Domain Adaptataion by Backpropagation, Skolkovo Institute of Science and Technology (Skoltech), Moscow Region, Russia, Proceedings of the 32nd International Conference on Machine Learning, Lille, France, 2015, JMLR: W&CP vol. 37, copyright 2015 by the author(s), 11 pages.
Ashish Shrivastava et al., Learning from Simulated and Unsupervised Images through Adversarial Training, Jul. 19, 2017, pp. 1-16.
Konstantinos Bousmalis et al., Domain Separation Networks, 29th Conference on Neural Information Processing Sysgtems (NIPS 2016), Barcelona, Spain. Aug. 22, 2016, pp. 1-15.
Eric Tzeng et al., Adversarial Discriminative Domain Adaptation, Feb. 17, 2017, pp. 1-10.
David Joseph Tan et al., Fits like a Glove: Rapid and Reliable Hand Shape Personalization, 2016 IEEE Conference on Computer Vision and Pattern Recognition, pp. 5610-5619.
Jonathan Taylor et al., Efficient and Precise Interactive Hand Tracking Through Joint, Continuous Optimization of Pose and Correspondences, SIGGRAPH '16 Technical Paper, Jul. 24-28, 2016, Anaheim, CA, ISBN: 978-1-4503-4279-87/16/07, pp. 1-12.
Toby Sharp et al., Accurate, Robust, and Flexible Real-time Hand Tracking, CHI '15, Apr. 18-23, 2015, Seoul, Republic of Korea, ACM 978-1-4503-3145-06/15/04, pp. 1-10.
Jonathan Taylor et al., Articulated Distance Fields for Ultra-Fast Tracking of Hands Interacting, ACM Transactions on Graphics, vol. 36, No. 4, Article 244, Publication Date: Nov. 2017, pp. 1-12.
GitHub—IntelRealSense/hand_tracking_samples: researc codebase for depth-based hand pose estimation using dynamics based tracking and CNNs, Mar. 26, 2020, 3 pages.
Stan Melax et al., Dynamics Based 3D Skeletal Hand Tracking, May 22, 2017, pp. 1-8.
Yarin Gal et al., Dropout as a Bayesian Approximation: Representing Model Uncertainty in Deep Learning, Oct. 4, 2016, pp. 1-12, Proceedings of the 33rd International Conference on Machine Learning, New York, Ny, USA, 2016, JMLR: W&CP vol. 48.
Kaiming He et al., Deep Residual Learning for Image Recognition, http://image-net.org/challenges/LSVRC/2015/ and http://mscoco.org/dataset/#detections-challenge2015, Dec. 10, 2015, pp. 1-12.
Sergey Ioffe et al., Batch Normalization: Accelerating Deep Network Training by Reducing Internal Covariat Shift, Mar. 2, 2015, pp. 1-11.
Diederik P. Kingma et al., Adam: A Method for Stochastic Optimization, Jan. 30, 2017, pp. 1-15.
Christoper M. Bishop, Pattern Recognition and Machine Learning, pp. 1-758.
Markus Oberweger et al., DeepPrior++: Improving Fast and Accurate 3D Hand Pose Estimation, Aug. 28, 2017, pp. 1-10.
Markus Oberweger et al., Hands Deep in Deep Learning for Hand Pose Estimation, Dec. 2, 2016, pp. 1-10.
Mahdi Rad et al., Feature Mapping for Learning Fast and Accurate 3D Pose Inference from Synthetic Images, Mar. 26, 2018, pp. 1-14.
Jonathan Tompson et al., Real-Time Continuous Pose Recovery of Human Hands Using Convolutional Networks, ACM Trans. Graph. 33, 5, Article 169, pp. 1-10.
Vincent Lepetit et al., Model Based Augmentation and Testing of an Annotated Hand Pose Dataset, ResearchGate, https://www.researchgate.net/publication/307910344, Sep. 2016, 13 pages.
Shome Subhra Das, Detectioin of Self Intersection in Synthetic Hand Pose Generators, 2017 Fifteenth IAPR International Conference on Machine Vision Applications (MVA), Nagoya University, Nagoya, Japan, May 8-12, 2017, pp. 354-357.
Marin, About LibHand, LibHand—A Hand Articulation Library, www.libhand.org/index.html, Mar. 26, 2020, pp. 1-2; www.libhand.org/download.html, 1 page; www.libhand.org/examples.html, pp. 1-2.
GitHub—danfis/libccd: Library for collision detection between two convex shapes, Mar. 26, 2020, pp. 1-6.
OGRECave/ogre—GitHub: ogre/Samples/Media/materials at 7de80a7483f20b50f2b10d7ac6de9d9c6c87d364, Mar. 26, 2020, 1 page.
Shanxin Yuan et al., BigHand2.2M Bechmark: Hand Pose Dataset and State of the Art Analysis, Dec. 9, 2017, pp. 1-9.
Office Action dated Apr. 8, 2020, for U.S. Appl. No. 16/198,959 (pp. 1-17).
Office Action dated Apr. 16, 2020 for U.S. Appl. No. 15/839,184 (pp. 1-8).
Notice of Allowance dated Apr. 22, 2020 for U.S. Appl. No. 15/671,107 (pp. 1-5).
Office Action dated Apr. 17, 2020 for U.S. Appl. No. 16/401,148 (pp. 1-15).
Office Action dated Apr. 28, 2020 for U.S. Appl. No. 15/396,851 (pp. 1-12).
Office Action dated Apr. 29, 2020 for U.S. Appl. No. 16/374,301 (pp. 1-18).
Nina Gaissert, Christian Wallraven, and Heinrich H. Bulthoff, "Visual and Haptic Perceptual Spaces Show High Similarity in Humans", published to Journal of Vision in 2010, available at http:// www.journalofvision.org/content/10/11/2 and retrieved on Apr. 22, 2020 ( Year: 2010), 20 pages.
Hua J, Qin H., Haptics-based dynamic implicit solid modeling, IEEE Trans Vis Comput Graph. Sep. 2004-Oct. 10(5):574-86.
Hilleges et al. Interactions in the air: adding further depth to interactive tabletops, UIST '09: Proceedings of the 22nd annual ACM symposium on User interface software and technologyOctober 2009 pp. 139-148.
International Search Report and Written Opinion for Application No. PCT/GB2019/051223, dated Aug. 8, 2019, 15 pages.
Partial International Search Report for Application No. PCT/GB2018/053735, dated Apr. 12, 2019, 14 pages.
International Search Report and Written Opinion for Application No. PCT/GB2018/053738, dated Apr. 11, 2019, 14 pages.
Sean Gustafson et al., "Imaginary Phone", Proceedings of the 24th Annual ACM Symposium on User Interface Software and Techology: Oct. 16-19, 2011, Santa Barbara, CA, USA, ACM, New York, NY, Oct. 16, 2011, pp. 283-292, XP058006125, Doi: 10.1145/2047196.2047233, ISBN: 978-1-4503-0716-1.
Office Action dated May 18, 2020 for U.S. Appl. No. 15/960,113 (pp. 1-21).
Optimal regularisation for acoustic source reconstruction by inverse methods, Y. Kim, P.A. Nelson, Institute of Sound and Vibration Research, University of Southampton, Southampton, SO17 1BJ, UK; 25 pages.
Takahashi et al., "Noncontact Tactile Display Based on Radiation Pressure of Airborne Ultrasound" IEEE Transactions on Haptics vol. 3, No. 3 p. 165 (2010).
International Search Report and Written Opinion for Application No. PCT/GB2019/052510, dated Jan. 14, 2020, 25 pages.
Partial ISR for Application No. PCT/GB2020/050013 dated May 19, 2020 (16 pages).

(56) References Cited

OTHER PUBLICATIONS

Search report for PCT/GB2015/052507 dated Mar. 11, 2020 (19 pages).
Search report for PCT/GB2015/052916 dated Feb. 26, 2020 (18 pages).
Notice of Allowance in U.S. Appl. No. 15/210,661 dated Jun. 17, 2020 (22 pages).
Notice of Allowance dated Jun. 17, 2020 for U.S. Appl. No. 15/210,661 (pp. 1-9).
EPO Communication for Application 18 811 906.9 (Nov. 29, 2021) (15 pages).
EPO Examination Report 17 748 4656.4 (Jan. 12, 2021) (16 pages).
Gareth Young et al.. Designing Mid-Air Haptic Gesture Controlled User Interfaces for Cars, PACM on Human-Computer Interactions, Jun. 2020 (24 pages).
ISR and WO for PCT/GB2020/052829 (Feb. 10, 2021) (15 pages).
ISR and WO for PCT/GB2021/052415 (Dec. 22, 2021) (16 pages).
Mohamed Yacine Tsalamlal, Non-Intrusive Haptic Interfaces: State-of-the Art Survey, HAID 2013, LNCS 7989, pp. 1-9, 2013.
Office Action (Non-Final Rejection) dated Jan. 21, 2022 for U.S. Appl. No. 17/068,834 (pp. 1-12).
Office Action (Non-Final Rejection) dated Jan. 24, 2022 for U.S. Appl. No. 16/228,767 (pp. 1-22).
Office Action (Non-Final Rejection) dated Mar. 4, 2022 for U.S. Appl. No. 16/404,660 (pp. 1-5).
Office Action (Notice of Allowance and Fees Due (PTOL-85)) dated Jan. 18, 2022 for U.S. Appl. No. 16/899,720 (pp. 1-2).
Office Action (Notice of Allowance and Fees Due (PTOL-85)) dated Feb. 11, 2022 for U.S. Appl. No. 16/228,760 (pp. 1-8).
Office Action (Notice of Allowance and Fees Due (PTOL-85)) dated Feb. 28, 2022 for U.S. Appl. No. 17/068,825 (pp. 1-7).
Office Action (Notice of Allowance and Fees Due (PTOL-85)) dated Mar. 7, 2022 for U.S. Appl. No. 16/600,496 (pp. 1-5).
Office Action dated Dec. 7, 2020 for U.S. Appl. No. 16/563,608 (pp. 1-8).
Corrected Notice of Allowability dated Jan. 14, 2021 for U.S. Appl. No. 15/897,804 (pp. 1-2).
Office Action dated Mar. 11, 2021 for U.S. Appl. No. 16/228,767 (pp. 1-23).
Aoki et al., Sound location of stero reproduction with parametric loudspeakers, Applied Acoustics 73 (2012) 1289-1295 (7 pages).
Search Report by EPO for EP 17748466 dated Jan. 13, 2021 (16 pages).
Wang et al., Device-Free Gesture Tracking Using Acoustic Signals, ACM MobiCom '16, pp. 82-94 (13 pages).
ISR and WO for PCT/GB2020/052829 (Feb. 1, 2021) (15 pages).
Bortoff et al., Pseudolinearization of the Acrobot using Spline Functions, IEEE Proceedings of the 31st Conference on Decision and Control, Sep. 10, 1992 (6 pages).
ISR and WO for PCT/GB2020/052545 (Jan. 27, 2021) (14 pages).
Bajard et al., Evaluation of Complex Elementary Functions / A New Version of BKM, SPIE Conference on Advanced Signal Processing, Jul. 1999 (8 pages).
Bajard et al., BKM: A New Hardware Algorithm for Complex Elementary Functions, 8092 IEEE Transactions on Computers 43 (1994) (9 pages).
Office Action dated Jun. 19, 2020 for U.S. Appl. No. 16/699,629 (pp. 1-12).
Office Action dated Jun. 25, 2020 for U.S. Appl. No. 16/228,767 (pp. 1-27).
Office Action dated Jul. 9, 2020 for U.S. Appl. No. 16/228,760 (pp. 1-17).
ISR and WO for PCT/GB2020/050926 (Jun. 2, 2020) (16 pages).
Mueller, GANerated Hands for Real-Time 3D Hand Tracking from Monocular RGB, Eye in-Painting with Exemplar Generative Adversarial Networks, pp. 49-59 (Jun. 1, 2018).
Seungryul, Pushing the Envelope for RGB-based Dense 3D Hand Pose Estimation for RGB-based Desne 3D Hand Pose Estimation via Neural Rendering, arXiv:1904.04196v2 [cs.CV] Apr. 9, 2019 (5 pages).
ISR and WO for PCT/GB2020/050013 (Jul. 13, 2020) (20 pages).
Bożena Smagowska & Małgorzata Pawlaczyk-Łuszczyńska (2013) Effects of Ultrasonic Noise on the Human Body—A Bibliographic Review, International Journal of Occupational Safety and Ergonomics, 19:2, 195-202.
Office Action dated Sep. 18, 2020 for U.S. Appl. No. 15/396,851 (pp. 1-14).
Office Action dated Sep. 21, 2020 for U.S. Appl. No. 16/198,959 (pp. 1-17).
Notice of Allowance dated Sep. 30, 2020 for U.S. Appl. No. 16/401,148 (pp. 1-10).
Notice of Allowance dated Oct. 1, 2020 for U.S. Appl. No. 15/897,804 (pp. 1-9).
Notice of Allowance dated Oct. 6, 2020 for U.S. Appl. No. 16/699,629 (pp. 1-8).
Notice of Allowance dated Oct. 16, 2020 for U.S. Appl. No. 16/159,695 (pp. 1-7).
Notice of Allowance dated Oct. 30, 2020 for U.S. Appl. No. 15/839,184 (pp. 1-9).
Georgiou et al., Haptic In-Vehicle Gesture Controls, Adjunct Proceedings of the 9th International ACM Conference on Automotive User Interfaces and Interactive Vehicular Applications (AutomotiveUI '17), Sep. 24-27, 2017 (6 pages).
Large et al.,Feel the noise: Mid-air ultrasound haptics as a novel human-vehicle interaction paradigm, Applied Ergonomics (2019) (10 pages).
Rocchesso et al.,Accessing and Selecting Menu Items by In-Air Touch, ACM CHItaly'19, Sep. 23-25, 2019, Padova, Italy (9 pages).
Shakeri, G., Williamson, J. H. and Brewster, S. (2018) May the Force Be with You: Ultrasound Haptic Feedback for Mid-Air Gesture Interaction in Cars. In: 10th International ACM Conference on Automotive User Interfaces and Interactive Vehicular Applications (AutomotiveUI 2018) (11 pages).
Imaginary Phone: Learning Imaginary Interfaces By Transferring Spatial Memory From a Familiar Device Sean Gustafson, Christian Holz and Patrick Baudisch. UIST 2011. (10 pages).
Office Action (Notice of Allowance and Fees Due (PTOL-85)) dated Aug. 24, 2022 for U.S. Appl. No. 16/198,959 (pp. 1-6).
Office Action (Notice of Allowance and Fees Due (PTOL-85)) dated Aug. 31, 2022 for U.S. Appl. No. 16/198,959 (pp. 1-2).
Office Action (Non-Final Rejection) dated Aug. 29, 2022 for U.S. Appl. No. 16/995,819 (pp. 1-6).
Office Action (Notice of Allowance and Fees Due (PTOL-85)) dated Sep. 7, 2022 for U.S. Appl. No. 17/068,834 (pp. 1-8).
ISR & WO for PCT/GB2022/051388 (Aug. 30, 2022) (15 pages).
Office Action (Notice of Allowance and Fees Due (PTOL-85)) dated Sep. 12, 2022 for U.S. Appl. No. 16/734,479 (pp. 1-7).
Office Action (Notice of Allowance and Fees Due (PTOL-85)) dated Sep. 8, 2022 for U.S. Appl. No. 17/176,899 (pp. 1-8).
Office Action (Final Rejection) dated Sep. 16, 2022 for U.S. Appl. No. 16/404,660 (pp. 1-6).
Office Action (Non-Final Rejection) dated Sep. 21, 2022 for U.S. Appl. No. 17/721,315 (pp. 1-10).
Office Action (Non-Final Rejection) dated Mar. 15, 2022 for U.S. Appl. No. 16/144,474 (pp. 1-13).
Office Action (Final Rejection) dated Mar. 14, 2022 for U.S. Appl. No. 16/564,016 (pp. 1-12).
Office Action (Non-Final Rejection) dated Apr. 1, 2022 for U.S. Appl. No. 16/229,091 (pp. 1-10).
ISR & WO For PCT/GB2021/052946, 15 pages.
Communication Pursuant to Article 94(3) EPC for EP 19723179.8 (Feb. 15, 2022), 10 pages.
Office Action (Non-Final Rejection) dated May 2, 2022 for U.S. Appl. No. 17/068,831 (pp. 1-10).
EPO ISR and WO for PCT/GB2022/050204 (Apr. 7, 2022) (15 pages).
IN 202047026493 Office Action dated Mar. 8, 2022, 6 pages.
https://radiopaedia.org/articles/physical-principles-of-ultrasound-1?lang=gb (Accessed May 29, 2022).
Certon, D., Felix, N., Lacaze, E., Teston, F., & Patat, F. (2001). Investigation of cross-coupling in 1-3 piezocomposite arrays. ieee transactions on ultrasonics, ferroelectrics, and frequency control, 48(1), 85-92.

(56) References Cited

OTHER PUBLICATIONS

Certon, D., Felix, N., Hue, P. T. H., Patat, F., & Lethiecq, M. (Oct. 1999). Evaluation of laser probe performances for measuring cross-coupling in 1-3 piezocomposite arrays. In 1999 IEEE Ultrasonics Symposium. Proceedings. International Symposium (Cat. No. 99CH37027) (vol. 2, pp. 1091-1094).
DeSilets, C. S. (1978). Transducer arrays suitable for acoustic imaging (No. GL-2833). Stanford Univ CA Edward L Ginzton Lab of Physics.
Walter, S., Nieweglowski, K., Rebenklau, L., Wolter, K. J., Lamek, B., Schubert, F., . . . & Meyendorf, N. (May 2008). Manufacturing and electrical interconnection of piezoelectric 1-3 composite materials for phased array ultrasonic transducers. In 2008 31st International Spring Seminar on Electronics Technology (pp. 255-260).
Patricio Rodrigues, E., Francisco de Oliveira, T., Yassunori Matuda, M., & Buiochi, F. (Sep. 2019). Design and Construction of a 2-D Phased Array Ultrasonic Transducer for Coupling in Water. In Inter-Noise and Noise-Con Congress and Conference Proceedings (vol. 259, No. 4, pp. 5720-5731). Institute of Noise Control Engineering.
Henneberg, J., Gerlach, A., Storck, H., Cebulla, H., & Marburg, S. (2018). Reducing mechanical cross-coupling in phased array transducers using stop band material as backing. Journal of Sound and Vibration, 424, 352-364.
Bybi, A., Grondel, S., Mzerd, A., Granger, C., Garoum, M., & Assaad, J. (2019). Investigation of cross-coupling in piezoelectric transducer arrays and correction. International Journal of Engineering and Technology Innovation, 9(4), 287.
Beranek, L., & Mellow, T. (2019). Acoustics: Sound Fields, Transducers and Vibration. Academic Press.
Office Action (Non-Final Rejection) dated Jun. 9, 2022 for U.S. Appl. No. 17/080,840 (pp. 1-9).
Office Action (Non-Final Rejection) dated Jun. 27, 2022 for U.S. Appl. No. 16/198,959 (pp. 1-17).
Office Action (Non-Final Rejection) dated Jun. 27, 2022 for U.S. Appl. No. 16/734,479 (pp. 1-13).
Chang Suk Lee et al., An electrically switchable visible to infra-red dual frequency cholesteric liquid crystal light shutter, J. Mater. Chem. C, 2018, 6, 4243 (7 pages).
Aksel Sveier et al.,Pose Estimation with Dual Quaternions and Iterative Closest Point, 2018 Annual American Control Conference (ACC) (8 pages).
Invitation to Pay Additional Fees for PCT/GB2022/051821 (dated Oct. 20, 2022), 15 pages.
JP Office Action for JP 2020-534355 (dated Dec. 6, 2022) (8 pages).
Ken Wada, Ring Buffer Basics (2013) 6 pages.
Notice of Allowance dated Feb. 23, 2023 for U.S. Appl. No. 18/060,556 (pp. 1-10).
Office Action (Ex Parte Quayle Action) dated Jan. 6, 2023 for U.S. Appl. No. 17/195,795 (pp. 1-6).
Office Action (Final Rejection) dated Jan. 9, 2023 for U.S. Appl. No. 16/144,474 (pp. 1-16).
Office Action (Final Rejection) dated Mar. 21, 2023 for U.S. Appl. No. 16/995,819 (pp. 1-7).
Office Action (Final Rejection) dated Nov. 18, 2022 for U.S. Appl. No. 16/228,767 (pp. 1-27).
Office Action (Final Rejection) dated Nov. 18, 2022 for U.S. Appl. No. 17/068,831 (pp. 1-9).
Office Action (Final Rejection) dated Dec. 8, 2022 for U.S. Appl. No. 16/229,091 (pp. 1-9).
Office Action (Non-Final Rejection) dated Mar. 1, 2023 for U.S. Appl. No. 16/564,016 (pp. 1-10).
Office Action (Non-Final Rejection) dated Mar. 22, 2023 for U.S. Appl. No. 17/354,636 (pp. 1-5).
Office Action (Non-Final Rejection) dated Apr. 19, 2023 for U.S. Appl. No. 18/066,267 (pp. 1-11).
Office Action (Non-Final Rejection) dated Apr. 27, 2023 for U.S. Appl. No. 16/229,091 (pp. 1-5).
Office Action (Non-Final Rejection) dated May 8, 2023 for U.S. Appl. No. 18/065,603 (pp. 1-17).
Office Action (Non-Final Rejection) dated May 10, 2023 for U.S. Appl. No. 17/477,536 (pp. 1-13).
Office Action (Non-Final Rejection) dated Oct. 17, 2022 for U.S. Appl. No. 17/807,730 (pp. 1-8).
Office Action (Non-Final Rejection) dated Nov. 9, 2022 for U.S. Appl. No. 17/454,823 (pp. 1-16).
Office Action (Non-Final Rejection) dated Nov. 16, 2022 for U.S. Appl. No. 17/134,505 (pp. 1-7).
Office Action (Non-Final Rejection) dated Nov. 16, 2022 for U.S. Appl. No. 17/692,852 (pp. 1-4).
Office Action (Non-Final Rejection) dated Dec. 6, 2022 for U.S. Appl. No. 17/409,783 (pp. 1-7).
Office Action (Non-Final Rejection) dated Dec. 22, 2022 for U.S. Appl. No. 17/457,663 (pp. 1-20).
Office Action (Notice of Allowance and Fees Due (PTOL-85)) dated Mar. 8, 2023 for U.S. Appl. No. 17/721,315 (pp. 1-8).
Office Action (Notice of Allowance and Fees Due (PTOL-85)) dated Mar. 15, 2023 for U.S. Appl. No. 17/134,505 (pp. 1-5).
Office Action (Notice of Allowance and Fees Due (PTOL-85)) dated Mar. 24, 2023 for U.S. Appl. No. 17/080,840 (pp. 1-8).
Office Action (Notice of Allowance and Fees Due (PTOL-85)) dated Apr. 4, 2023 for U.S. Appl. No. 17/409,783 (pp. 1-5).
Office Action (Notice of Allowance and Fees Due (PTOL-85)) dated Apr. 6, 2023 for U.S. Appl. No. 17/807,730 (pp. 1-7).
Office Action (Notice of Allowance and Fees Due (PTOL-85)) dated Apr. 28, 2023 for U.S. Appl. No. 17/195,795 (pp. 1-7).
Office Action (Notice of Allowance and Fees Due (PTOL-85)) dated May 12, 2023 for U.S. Appl. No. 16/229,091 (pp. 1-8).
Office Action (Notice of Allowance and Fees Due (PTOL-85)) dated May 24, 2023 for U.S. Appl. No. 16/229,091 (pp. 1-2).
Office Action (Notice of Allowance and Fees Due (PTOL-85)) dated Oct. 31, 2022 for U.S. Appl. No. 17/068,834 (pp. 1-2).
Office Action (Notice of Allowance and Fees Due (PTOL-85)) dated Oct. 31, 2022 for U.S. Appl. No. 17/176,899 (pp. 1-2).
Office Action (Notice of Allowance and Fees Due (PTOL-85)) dated Nov. 1, 2022 for U.S. Appl. No. 16/404,660 (pp. 1-5).
Office Action (Notice of Allowance and Fees Due (PTOL-85)) dated Nov. 2, 2022 for U.S. Appl. No. 16/734,479 (pp. 1-2).
Office Action (Notice of Allowance and Fees Due (PTOL-85)) dated Nov. 10, 2022 for U.S. Appl. No. 16/198,959 (pp. 1-2).
Office Action (Notice of Allowance and Fees Due (PTOL-85)) dated Nov. 16, 2022 for U.S. Appl. No. 16/404,660 (pp. 1-2).
Office Action dated Feb. 9, 2023 for U.S. Appl. No. 18/060,556 (pp. 1-5).
Office Action dated Mar. 3, 2023 for U.S. Appl. No. 18/060,525 (pp. 1-12).
Office Action dated Apr. 19, 2023 for U.S. Appl. No. 18/066,267 (pp. 1-11).
Partial ISR for PCT/GB2023/050001 (Mar. 31, 2023) 13 pages.
Rakkolainen et al., A Survey of Mid-Air Ultrasound Haptics and Its Applications (IEEE Transactions on Haptics), vol. 14, No. 1, 2021, 18 pages.

* cited by examiner

USING ITERATIVE 3D-MODEL FITTING FOR DOMAIN ADAPTATION OF A HAND-POSE-ESTIMATION NEURAL NETWORK

PRIOR APPLICATION

This application claims the benefit of U.S. Provisional Patent Application Ser. No. 62/833,085, filed on Apr. 12, 2019, which is incorporated by reference in its entirety.

FIELD OF THE DISCLOSURE

The present disclosure relates generally to the task of estimating a human hand pose from a depth camera frame.

BACKGROUND

A number of depth camera technologies exist. Time of flight image sensors measure the phase of a uniform square wave infrared illuminator. Structured light image sensors project a pattern, such as a grid of dots. The location of the dots in the projected space are used to estimate depth. Stereo cameras use two image sensors with offset lenses. As an example, FIG. 1 shows a single frame 100 from a time-of-flight camera where depth pixels are captured from the image sensor. Pixel intensity represents the distance between the sensor and the scene. (This FIG. 1 and FIGS. 3, 4, 5 were plotted using Matplotlib: http://matplotlib.org/#citing-matplotlib.)

Recent hand pose estimation algorithms may be divided into two categories: generative iterative 3D spatial model fitting-based approaches and supervised-learning based discriminative approaches. As stated by Oberweger, Wohlhart, Lepetit, 2015, Hands Deep in Deep Learning for Hand Pose Estimation ("Oberweger I"): "Here we will discuss only more recent work, which can be divided into two main approaches . . . The first approach is based on generative, model based tracking methods . . . The second type of approach is discriminative, and aims at directly predicting the locations of the joints from RGB or RGB-D images."

Iterative 3D model fitting algorithms tend to use the previous frame or a discriminative algorithm for initialization. An example of the combined discriminative approach is the work by Sharp et al. that uses a per-pixel decision jungle—trained on synthetic depth frames—to initialize a particle swarm optimization algorithm that iteratively attempts to minimize the error between the pixels of the captured frame and a rendered synthetic frame of the pose. (Sharp. 2015. Handpose Fully Articulated Hand Tracking). An issue with this approach is that it is heavy on computing resources and requires a GPU to run at real-time. However, Taylor et al. has shown in 2 articles that it is feasible to run an iterative 3D model fitting algorithm on a CPU by using a smooth differentiable surface model instead of rendering the hand model. (Jonathan Taylor. Efficient and Precise Interactive Hand Tracking Through Joint, Continuous Optimization of Pose and Correspondences; Jonathan Taylor. 2017. Articulated Distance Fields for Ultra-Fast Tracking of Hands Interacting).

With recent advances in convolutional neural network (CNN) models, it has also been shown that high accuracy can be achieved without an expensive iterative 3D model fitting stage. Rad et al ("Rad") uses a CNN to achieve state-of-the-art accuracy hand pose estimation without the need for a generative fitting stage in the real-time pipeline. (Rad, Oberweger, Lepetit. 2017. Feature Mapping for Learning Fast and Accurate 3D Pose Inference from Synthetic Images.)

Training a CNN requires a large labeled dataset. (See, for example, Shanxin Yuan. 2017. BigHand2.2M Benchmark: Hand Pose Dataset and State of the Art Analysis ("Shanxin")) (dataset includes 2.2 million depth maps with accurately annotated joint locations). Obtaining such a large labeled dataset is a major challenge. It is important that the depth frames in the training dataset represents the target domain of the depth frames used at inference time. The target domain is dependent on the model of depth camera, the surrounding environment, camera view, and the shape of the human hand. Human annotation of depth frames in 3D is unfeasibly labor intensive, and the process needs to be repeated each time the domain of the depth frame changes. A more feasible solution is to use an optical marker or electromagnetic based tracking system. (See Shanxin: "We propose a tracking system with six 6D magnetic sensors and inverse kinematics to automatically obtain 21-joints hand pose annotations of depth maps captured with minimal restriction on the range of motion."). These methods have their own limitations, however, such as the markers also being visible to the depth camera and drift of an electromagnetic tracking system. Even if these limitations could be mitigated, capturing a large hand pose dataset would be time consuming and therefore limited to a small set of camera models, environments, and hands.

Another more practical solution is to use a semi-manual process where the pose annotation is initialized by either a human or the preceding frame, and then optimized using a iterative 3D model fitting optimization technique that minimizes error between the camera sampled point cloud and a synthetic 3D hand model. Examples include:

A. Intel Realsense Hand Tracking Samples, http://github.com/IntelRealSense/hand_tracking_samples Stan Melax. 2017. "This realtime-annotator utility application is provided for the purposes of recording real-time camera streams alongside auto-labeled ground-truth images of hand poses as estimated by the dynamics-based tracker. Sequences are recorded using a simple tile-format consumable by other projects in this repository . . . annotation-fixer. As CNNs require a volume of accurate, diverse data to produce meaningful output, this tool provides an interface for correcting anomalous hand poses captured using the hand-annotation utility."

B. Dynamics Based 3D Skeletal Hand Tracking, Stan Melax. 2017: "Instead of using dynamics as an isolated step in the pipeline, such as the way an inverse kinematic solver would be applied only after placement of key features is somehow decided, our approach fits the hand to the depth data (or point cloud) by extending a physics system through adding additional constraints. Consequently, fitting the sensor data, avoiding interpenetrating fingers, preserving joint ranges, and exploiting temporal coherence and momentum are all constraints computed simultaneously in a unified solver"

C. Tompson et al. Real-Time Continuous Pose Recovery of Human Hands Using Convolutional Networks: "In this work, we present a solution to the difficult problem of inferring the continuous pose of a human hand by first constructing an accurate database of labeled ground-truth data in an automatic process, and then training a system capable of real-time inference. Since the human hand represents a particularly difficult kind of articulable object to track, we believe our solution is applicable to a wide range of articulable objects."

These semi-manual techniques are similar to the combined discriminative and generative techniques discussed above, except they are run offline without the real-time constraint.

It is possible to make use of a dataset in a domain where abundant labeled frames are available to train a neural network that performs well in a domain where limited labeled frames are available. One example is Ganin, Ajakan, Larochelle, Marchand. 2017. Domain-Adversarial Training of Neural Networks ("Ganin I"), which states: "We introduce a new representation learning approach for domain adaptation, in which data at training and test time come from similar but different distributions. Our approach is directly inspired by the theory on domain adaption suggesting that, for effective domain transfer to be achieved, predictions must be made based on features that cannot discriminate between the training (source) and test (target) domains. The approach implements this idea in the context of neural network architectures that are trained on labeled data from the source domain and unlabeled data from the target domain (no labeled target-domain data is necessary). As the training progresses, the approach promotes the emergence of features that are (I) discriminative for the main learning task on the source domain and (ii) indiscriminate with respect to the shift between the domains. We show that this adaption behavior can be achieved in almost any feed-forward model by augmenting it with few standard layers and a new gradient reversal layer. The resulting augmented architecture can be trained using standard backpropagation and stochastic gradient descent, and can thus be implemented with little effort using any of the deep learning packages."

Another example is Ganin, Lempitsky. 2015. Unsupervised Domain Adaptation by Backpropagation ("Ganin II"), which states: "At training time, in order to obtain domain-invariant features, we seek the parameters of the feature mapping that maximize the loss of the domain classifier (by making the two feature distributions as similar as possible), while simultaneously seeking the parameters of the domain classifier that minimize the loss of the domain classifier. In addition, we seek to minimize the loss of the label predictor."

Another example is Ashish Shrivastava. 2016. Learning from Simulated and Unsupervised Images through Adversarial Training, which states: "With recent progress in graphics, it has become more tractable to train models on synthetic images, potentially avoiding the need for expensive annotations. However, learning from synthetic images may not achieve the desired performance due to a gap between synthetic and real image distributions. To reduce this gap, we propose Simulated+Unsupervised (S+U) learning, where the task is to learn a model to improve the realism of a simulator's output using unlabeled real data, while preserving the annotation information from the simulator. We develop a method for S+U learning that uses an adversarial network similar to Generative Adversarial Networks (GANs), but with synthetic images as inputs instead of random vectors."

Another example is Konstantinos Bousmalis. 2016. Domain Separation Networks, which states: "The cost of large scale data collection and annotation often makes the application of machine learning algorithms to new tasks or datasets prohibitively expensive. One approach circumventing this cost is training models on synthetic data where annotations are provided automatically. Despite their appeal, such models often fail to generalize from synthetic to real images, necessitating domain adaptation algorithms to manipulate these models before they can be successfully applied. Existing approaches focus either on mapping representations from one domain to the other, or on learning to extract features that are invariant to the domain from which they were extracted. However, by focusing only on creating a mapping or shared representation between the two domains, they ignore the individual characteristics of each domain. We suggest that explicitly modeling what is unique to each domain can improve a model's ability to extract domain—invariant features."

Another example is Eric Tzeng. 2017. Adversarial Discriminative Domain Adaptation, which states: "We propose an improved unsupervised domain adaptation method that combines adversarial learning with discriminative feature learning. Specifically, we learn a discriminative mapping of target images to the source feature space (target encoder) by fooling a domain discriminator that tries to distinguish the encoded target images from source examples."

Computer graphics rendering techniques can be used to render a very large dataset of labeled synthetic depth frames. Training in only the synthetic frame domain does not necessarily generalize to a model that performs well in the real depth camera frame domain. However, it has been shown that it is possible to make use of a small labeled real frame dataset alongside a large synthetic frame dataset to achieve a model estimation accuracy in the real domain that is higher than achievable by training on each dataset alone. (See Rad).

SUMMARY

The solution proposed herein is to solve the large labeled dataset challenge by using a domain adaptation technique to train a discriminative model such as a convolutional neural network or "CNN" using an iterative 3D model fitting generative algorithm such as a genetic algorithm or "GA" at training time to refine target domain labels. The neural network supports the convergence of the genetic algorithm, and the genetic algorithm model provides refined labels that are used to train the neural network. During real-time inference, only the trained neural network is required. First, using a technique similar to Ganin I and Ganin II, a CNN is trained using labeled synthetic frames (source domain) in addition to unlabeled real depth frames (target domain). Next, the CNN initializes an offline iterative 3D model fitting algorithm that is capable of accurately labeling the hand pose in real depth frames (target domain). The labeled real depth frames are then used to continue training the CNN, improving accuracy beyond that achievable by using only unlabeled real depth frames for domain adaptation. The merits of this approach are that no manual effort is required to label depth frames and the 3D model fitting algorithm does not have any real-time constraints.

BRIEF DESCRIPTION OF THE FIGURES

The accompanying figures, where like reference numerals refer to identical or functionally similar elements throughout the separate views, together with the detailed description below, are incorporated in and form part of the specification, serve to further illustrate embodiments of concepts that include the claimed invention and explain various principles and advantages of those embodiments.

Figure 1:
FIG. 1 shows depth pixels captured from a time of flight image sensor.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The offline model training system can be split into two main subsystems that support each other: The discriminative model (neural network) that infers a pose from a single depth frame, and the generative 3D model fitting algorithm (genetic algorithm) that iteratively refines the 3D pose. The neural network is used to initialize the genetic algorithm, and the genetic algorithm is used to provide accurate labels in the target domain that are used for training the neural network. This presents the problem where each subsystem requires the output from the other subsystem. This problem is solved by using synthetically rendered labeled frames to initially train the neural network. During real-time pose estimation, only the neural network is used for inference.

Model Training

Figure 2:
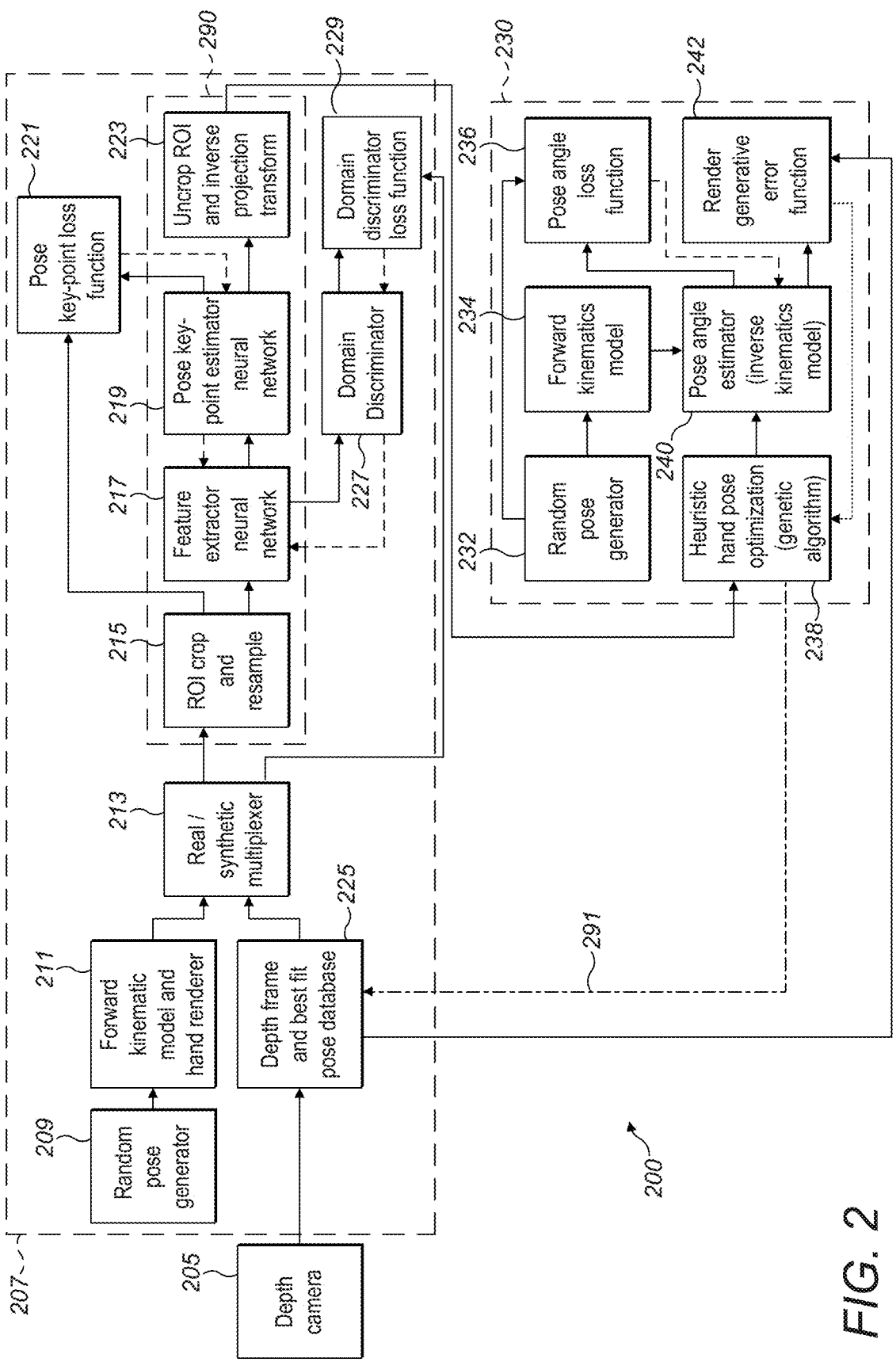
FIG. 2 shows a block diagram of the training process.

FIG. 2 shows the high-level system block diagram 200 of the training process using a depth camera 205. A neural network 207 is trained and the output from the neural network is used to initialize an iterative 3D model fitting process 230. The 3D model fitting process is used to update 291 the real frame key-point labels in the real depth frame database 225 that are used to train the neural network.

FIG. 2 includes four types of interfaces as shown by arrow type: A) black line arrows represent depth frames, poses, domain classes, and activations; B) dashed line arrows represent back-propagation of error gradients; C) the dotted line arrow represents error feedback; and D) the dotted/dashed line arrow represents feedback of the refined real frame pose labels.

A) The following interfaces are related to depth frames, poses, domain classes, and activations:

The depth camera 205 interfaces with the depth frame and best fit pose database 225.

A random pose generator 209 interfaces with a forward kinematic model and hand renderer 211, which then interfaces with a real/synthetic multiplexer 213. Also interfacing with the real/synthetic multiplexer 213 is a depth frame and best fit pose database 225.

The real/synthetic multiplexer 213 interfaces with a ROI crop and resample submodule 215, which is part of a module 290 consisting of the ROI crop and resample submodule 215, a feature extractor neural network submodule 217, a pose key-point estimator neural network submodule 219 and an uncrop ROI and inverse projection transform submodule 223. Each of these submodules interfaces with the next.

Further, the ROI crop and resample submodule 215 and the pose key-point estimator neural network submodule 219 interface with a pose key-point loss function 221.

Further, the domain class from the real/synthetic multiplexer 213 interfaces with a domain discriminator's loss function 229.

Further, the feature extractor neural network 217 interfaces with the domain discriminator neural network 227, which also interfaces with the domain discriminator loss function 229.

The uncrop ROI and inverse projection transform submodule 223 then interfaces with the iterative 3D model fitting process 230. This is accomplished by interfacing with a heuristic hand pose optimization submodule (genetic algorithm) 238, which interfaces with a pose angle estimator neural network (inverse kinematic model) 240, which interfaces with a pose angle loss function 236.

Further, a random pose generator 232 interfaces with a forward kinematic model 234 and the pose angle loss function 236.

Further, the forward kinematic model 234 interfaces with the pose angle estimator (inverse kinematic model) 240.

Further, the pose angle estimator (inverse kinematics model) 240 interfaces with a render generative error function 242.

Finally, the depth frame and best fit database 225 interfaces with the render generative error function 242.

B) The following interfaces are related to back-propagation of error gradients:

The domain discriminator 227 interfaces with the feature extractor neural network 217.

The pose key-point loss function 221 interfaces with the pose key-point estimator neural network 219.

The domain discriminator loss function 229 interfaces with the domain discriminator 227.

The pose angle loss function 236 interfaces with the pose angle estimator (inverse kinematic model) 240.

C) The following interface is related to error feedback: The render generative error function 242 interfaces with the heuristic hand pose optimization (genetic algorithm) 238.

D) The following interface is related to feedback of refined pose label: The heuristic hand pose optimization (genetic algorithm) 238 interfaces with the depth frame and best fit database 225.

The stages of training the pose estimator and feature extractor neural networks are:

Using backpropagation, optimize pose estimator and feature extractor CNNs to minimize key-point error when using only synthetic depth frames. Synthetic frames are cropped using hand-center key-point (with a small random offset) during training.

2. Estimate center of hand in unlabeled real depth frames using pose estimation and feature extractor CNNs so that real frames can be cropped.

3. Using backpropagation, optimize domain discriminator CNN to estimate if the output from feature extractor CNN is generated from a real or synthetic depth frame.

4. Continue to train pose estimation and feature extractor CNNs with both real and synthetic depth frames. Optimize to minimize key-point error for frames with known key-point labels. Optimize the feature extractor CNN so that features extracted from real frames are classified as synthetic by the domain discriminator. By doing this, features that are mostly domain invariant are extracted.

5. Use pose estimator and feature extractor CNNs with injected noise to generate a pose ensemble for each real depth frame. Use the pose ensemble to initialize a GA. Iteratively update the pose key-point positions to minimize a pose fitness function. To compute the pose fitness, use inverse kinematics to compute the joint angles and then render a synthetic depth frame in a similar pose. The error between the rendered frame and the real frame is used as the pose fitness. Using additional checks, determine if pose converges successfully. For each pose that successfully converges, add the pose label to the real frame database.

6. Repeat from step 4, using the labeled real depth frames.

Random Pose Renderer

The open-source LibHand library is used for rendering a 3D model of a human hand. LibHand consists of a human hand realistic mesh and an underlying kinematic skeletal model. LibHand is then modified to use the dual quaternion skinning vertex shader of Kavan et al., which discloses: "Skinning of skeletally deformable models is extensively used for real-time animation of characters, creatures and similar objects. The standard solution, linear blend skinning, has some serious drawbacks that require artist intervention. Therefore, a number of alternatives have been proposed in recent years. All of them successfully combat some of the artifacts, but none challenge the simplicity and efficiency of linear blend skinning. As a result, linear blend skinning is still the number one choice for the majority of developers. In this paper, we present a novel GPU-friendly skinning algorithm based on dual quaternions. We show that this approach solves the artifacts of linear blend skinning at minimal additional cost. Upgrading an existing animation system (e.g., in a videogame) from linear to dual quaternion skinning is very easy and had negligible impact on run-time performance." (Ladislav Kavan et al. 2007. Skinning with Dual Quaternions. Implementation downloaded from: http://github.com/OGRECave/ogre/tree/7de80a748/Samples/Media/materials).

Accordingly, dual quaternion skinning is used to compute the deformation of the hand mesh vertices as the kinematic skeletal model is articulated. A fragment shader is used to set the pixel color to the depth of the mesh surface. The projection matrix used in the computer graphics pipeline is set to match the intrinsics of the real depth camera that is being modeled.

To generate realistic poses for the synthetic hand either a rule-based approach or a data-driven approach could be used. It is important that the distribution of sampled poses is similar to the distribution of real poses of a human user. An example of a simple data driven approach could be to sample from a pre-recorded hand pose dataset captured using a mo-cap system. Interpolation could be used to further extend the recorded dataset. An example of a rule-based approach is to model the angle of each joint with a uniform distribution with hard-coded maximum and minimum limits. With both the interpolation and uniform distribution of joint angle approaches, impossible poses could be generated where the hand self-intersects. A mesh collision technique similar to Shome Subhra Das, 2017, Detection of Self Intersection in Synthetic Hand Pose Generators is used to reject poses that result in the mesh self-intersecting. This reference states: "We propose a method to accurately detect intersections between various hand parts of a synthesized handpose. The hand mesh and the segmented texture image . . . are loaded into the rendering engine . . . From the vertex buffer of the rendering engine we extract the 3D location of the vertices (V) and the corresponding texture coordinates (T) after the locations of vertices have been modified according to the input joint angles (using LBS [Location-based services]). We segment the vertices using color label corresponding to each part and find the convex hulls for all the segmented hand parts . . . The penetration depth between these convex hulls are calculated using GJK-EPA [Gilbert-Johnson-Keerthi expanding polytope] algorithm. We label pairs of hand parts as intersecting if they have negative penetration depth."

Accordingly, first, a candidate pose is rendered with a low polygon mesh. For each part of the hand where self-intersection should be checked, a convex polytope is formed from the corresponding vertices. Pairs of polytopes are checked for intersection using the GJK+EPA algorithm that is implemented within Daniel Fiser. libccd: Library for collision detection between two convex shapes. http://github.com/danfis/libccd. libccd is library for a collision detection between two convex shapes and implements variation on Gilbert-Johnson-Keerthi algorithm plus Expand Polytope Algorithm (EPA). If any of the checked pairs intersect by more than a fixed threshold the pose is rejected and the process is repeated until a valid pose is found. The valid pose can then be used to render a high polygon mesh.

Figure 3:
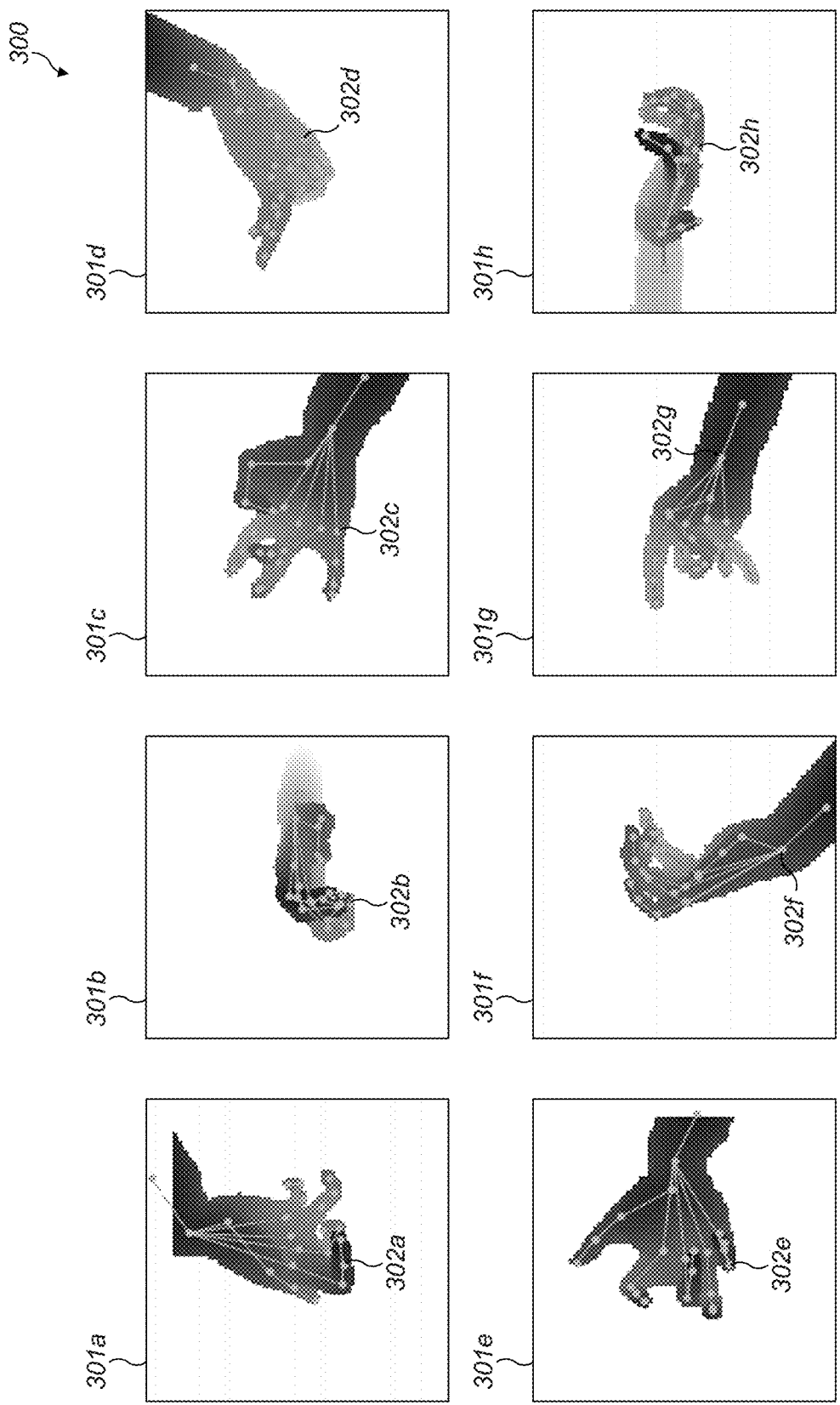
FIG. 3 shows random samples of generated synthetic frames cropped on a region of interest (ROI).
Figure 3:
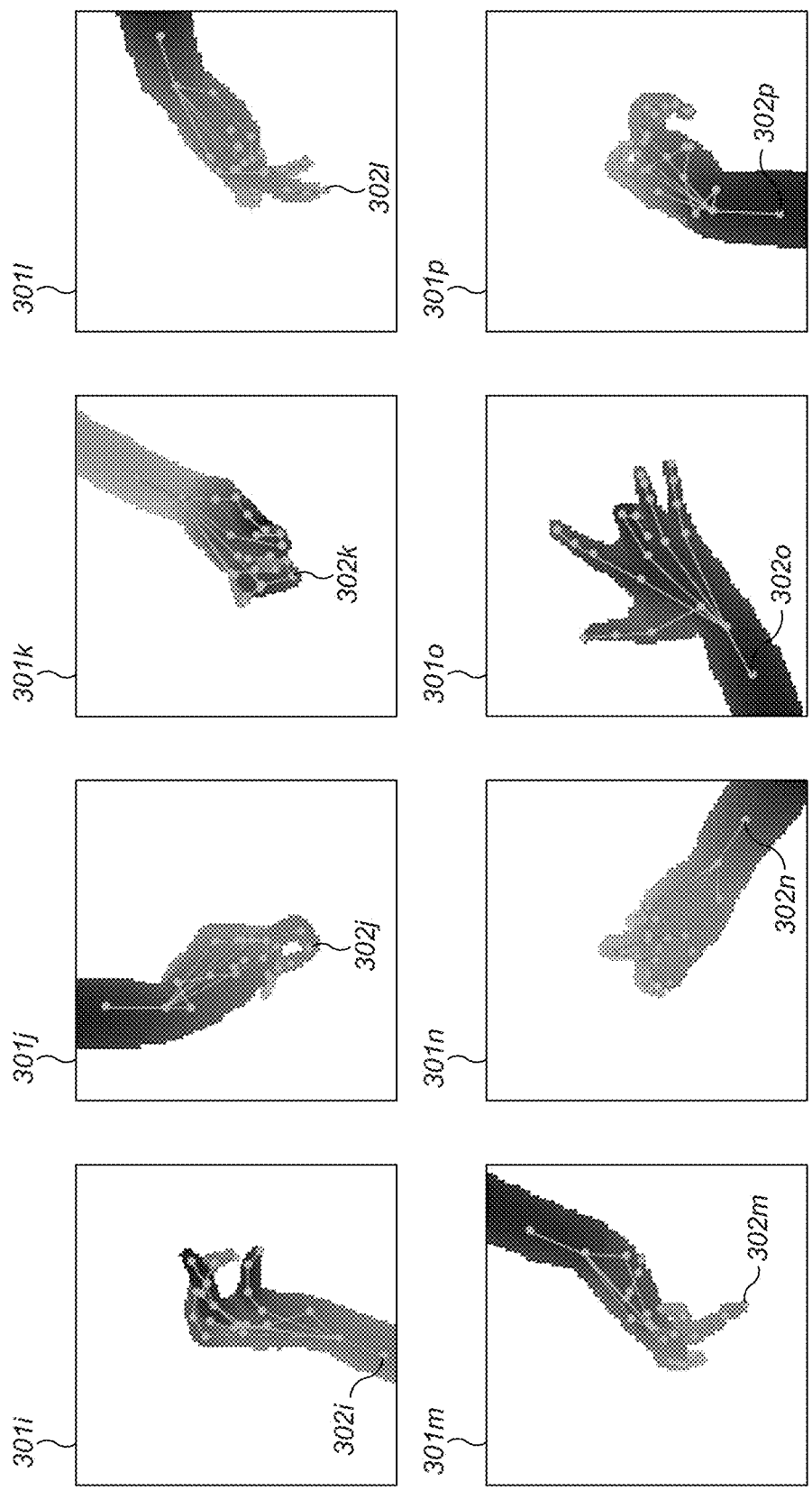

FIG. 3 shows a random sample 300 of 16 synthetic frames cropped on ROI 301a-301p. Poses are generated using the rule-based approach discussed above, with self-intersecting poses rejected. Gray markers 302a-302p show key-points calculated using the forward kinematic model.

Region of Interest (ROI) Cropping

In order to provide a depth frame input to the CNN that is mostly invariant to hand center location, a ROI cropping technique similar to that implemented by Oberweger I is used. Oberweger I states: "We extract from the depth map a fixed-size cube centered on the center of mass of this object, and resize it to a 128×128 patch of depth values normalized to [−1, 1]. Points for which the depth is not available—which may happen with structured light sensors for example—or are deeper than the back face of the cube, are assigned a depth of 1. This normalization is important for the CNN in order to be invariant to different distances from the hand to the camera." First, the ROI center in normalized pixel coordinates, [cu,cv], and depth in world units, cz, is estimated. Next, a fixed size, $[b_x, b_y]$, cropping rectangle in world units at the ROI center depth, $c_z$, is projected to a cropping rectangle in normalized pixels, $[b_u, b_v]$:

$$[b_u \ b_v] = [b_x \ b_y] \begin{bmatrix} \frac{f_x}{c_z} & 0 \\ 0 & \frac{f_y}{c_z} \end{bmatrix}$$

where $f=[f_x, f_y]$ is the camera focal length in normalized pixels. The focal length is determined by the camera optics. Then, depth frame pixels are cropped using the cropping rectangle in normalized pixel space, $[b_u, b_v]$, centered at $[c_u, c_v]$. The cropped frame is resized to a fixed number of pixels using bilinear interpolation. The depth pixel values are normalized by subtracting c and then dividing by a constant, $$\frac{b_z}{2}.$$

Depth pixel values are men clipped to the range [−1,1]. The resized frames are 128×128 pixels, and $b_x=b_y=b_z=25$ cm.

It is important that the location of joints, [u, v, z], are also normalized using the same cropping frustum defined by $[b_u, b_v, b_z]$ and $[c_u, c_v, c_z]$:

$$\begin{bmatrix} u_n \\ v_n \\ z_n \end{bmatrix} = \left( \begin{bmatrix} u \\ v \\ z \end{bmatrix} - \begin{bmatrix} c_u \\ c_v \\ c_z \end{bmatrix} \right) \begin{bmatrix} \frac{2}{b_u} & 0 & 0 \\ 0 & \frac{2}{b_v} & 0 \\ 0 & 0 & \frac{2}{b_z} \end{bmatrix}$$

After the normalized pose key-points, $[u_n, v_n, z_n]$, have been inferred by the CNN, $[u,v,z]$ are calculated using the inverse of the foregoing equation. FIG. 2 shows these operations with the module 290 as crop 215 and uncrop 223 blocks at the input and output of the feature extractor 217 and pose estimation neural networks 219.

Depth Frame Database

Depth frames are captured from the target camera and saved, for example, to a HDF5 file. Since this process does not require ground truth pose labels to be captured, the process is very simple. The simplicity of this process will allow a large dataset to be captured in the future. The depth frames are stored in sequential order along with camera metadata including optical intrinsics.

Initially, the unlabeled real frames are used for domain adaptation of the neural network. When the genetic algorithm, that is initialized by the neural network, converges on a good pose for a depth frame, the labels are added to the database. The labeled frames are used for training of the neural network.

Feature Extractor and Pose Key-Point Neural Networks

Together, the feature extractor and pose key-point CNNs compute pose key-points from a depth frame ROI. The feature extractor CNN extracts features that contain pose information, while also being mostly domain invariant. The feature extractor CNN input is a 128×128 frame and the output is a 31×31×64 tensor. An architecture with shortcut connections, similar to the Residual Networks introduced by He et al and applied to hand pose estimation by Oberweger et al ("Oberweger II") is used.

He et al. states: "We present a residual learning framework to ease the training of networks that are substantially deeper than those used previously. We explicitly reformulate the layers as learning residual functions with reference to the layer inputs, instead of learning unreferenced functions. We provide comprehensive empirical evidence showing that these residual networks are easier to optimize, and can gain accuracy from considerably increased depth." (He et al., Deep Residual Learning for Image Recognition.)

Oberweger II states: "Here we show that with simple improvements: adding ResNet layers, data augmentation, and better initial hand localization, we achieve better or similar performance than more sophisticated recent methods on the three main benchmarks (NYU, ICVL, MSRA) while keeping the simplicity of the original method." (Oberweger, Lepetit, 2018, Deep Prior Improving Fast and Accurate 3D Hand Pose Estimation.)

A residual convolution block {M1, M2, M3, N1, N2} is defined as: A M1×1×1 2D convolution layer with a stride of N2 followed by a batch normalization (BN) layer and a rectified linear unit (ReLU) activation. This is connected to M 2×N 1×N 1 2D convolution layer, followed by BN, ReLU layers, then a M3×1×1 2D convolution layer followed BN. The output from this is added to either the input of the block, to form an identity residual convolution block, or a M 3×1×1 convolution layer connected to the input. The sum layer is followed by a ReLU layer. The architecture of the feature extractor is: 2D convolution 64×7×7, BN, ReLU, max pooling 3×3 with stride of 2, residual convolution block {32, 32, 64, 3, 1}, followed by a 2 identity residual convolution blocks {32, 32, 64, 3, 1}.

BN is discussed in Ioffe, Szegedy. 2015. Batch Normalization Accelerating Deep Network Training by Reducing Internal Covariate Shift, which states: "Our proposed method draws its power from normalizing activations, and from incorporating this normalization in the network architecture itself. This ensures that the normalization is appropriately handled by any optimization method that is being used to train the network."

The architecture of the pose estimator CNN may be: Residual convolution block {64,64,128,3,2}, 3 identity residual convolution blocks {64, 64, 128, 3, 1}, residual convolution block {256, 256, 512, 3, 2}, 4 identity residual convolution blocks {256, 256, 512, 3, 1}, residual convolution block {64, 128, 128, 3, 2}, 2 identity residual convolution blocks {64,128,128,3,1}, 2 fully connected layers each with 1024 neurons and a ReLU activation function, followed by a fully connected output layer with a neuron for each key-point and a linear activation function.

The feature domain discriminator may have the following architecture: 2D convolution 64×1×1, BN, leaky ReLU, 2D global average pooling, followed by a single output neuron with a sigmoid activation function. The global average pooling is important to prevent the discriminator over-fitting to pose information in the features. Over-fitting to pose information is possible because the pose distribution of synthetic and real frames do not match. Alternative network architectures could be used, including extracting features for the domain discriminator at more than one layer.

The error function of the estimated pose batch needs to be valid for training batches that contain unknown key-points. For this, the pose error function, $E_p(y,m,\hat{y})$, is a masked mean squared error of the key-point positions, $y_{i,j} \in R^3$ where $\hat{y}_{i,j}$ is an estimated key-point position and the mask, $m_{i,j} \in \{0, 1\}$, indicates if the key-point position error $y_{i,j} - \hat{y}_{i,j}$, should not be excluded. This is shown in the following equation $$E_p(y, m, \hat{y}) = \frac{\sum_{j=0}^{M-1} \sum_{i=0}^{N-1} m_{i,j} \|\hat{y}_{i,j} - y_{i,j}\|_2^2}{\sum_{j=0}^{M-1} \sum_{i=0}^{N-1} m_{i,j}}$$

where N is the number training poses within a batch and M is the number of key-points in a pose.

The error function of the estimated domain $E_d(d,d)$ is defined as the binary cross-entropy, where $d \in \{0, 1\}$ is the domain, and $0 < \hat{d} < 1$ is the estimated domain. In this equation, the value 1 is used to represent the real domain, and 0 is used to represent the synthetic domain:

$$E_d(d, \hat{d}) = -\sum_{i=0}^{N-1} \left( d_i \ln \hat{d}_i + (1 - d_i) \ln(1 - \hat{d}_i) \right)$$

Regarding cross-entropy, C. M. Bishop (2006). Pattern Recognition and Machine Learning. Springer, p. 206, teaches that "As usual, we can define an error function by taking the negative logarithm of the likelihood, which gives the cross-entropy error function in the form:

$$E(w) = \ln p(t \mid w) = -\sum_{n=1}^{N} \{t_n \ln y_n + (1 - t_n) \ln(1 - y_n)\}"$$

The feature extractor and pose estimation layers are trained together with a loss function, $L_f(d, \hat{d}, y, m, \hat{y})$ defined as:

$$L_f(d,\hat{d},y,m,\hat{y}) = kE_d(0,\hat{d}) + E_p(y,m,\hat{y})$$

where k is a hyper-parameter that weights the importance of domain error over pose error. And the domain discriminator layers are trained with a loss function, $L_d(d, \hat{d})$ defined as:

$$L_d(d,\hat{d}) = E_d(d,\hat{d})$$

The feature extractor and pose estimation layers are optimized using the backpropagation of gradients algorithm with the Adam optimizer disclosed in Kingma, Ba. 2014. Adam A Method for Stochastic Optimization. This reference discloses: "We propose Adam, a method for efficient stochastic optimization that only requires first-order gradients with little memory requirement. The method computes individual adaptive learning rates for different parameters from estimates of first and second moments of the gradients; the name Adam is derived from adaptive moment estimation." The domain discriminator layers are optimized with a stochastic gradient descent optimizer. This optimization approach is similar to the approach described by Ganin II, which states: "Rather than using the gradient reversal layer, the construction introduces two different loss functions for the domain classifier. Minimization of the first domain loss (Ld+) should lead to a better domain discrimination, while the second domain loss (Ld−) is minimized when the domains are distinct." "In that case 'adversarial' loss is easily obtained by swapping domain labels."

The model, consisting of feature extractor and pose estimation layers, is first trained using only synthetic frames. The model is then used to infer key-points on a set of real depth frames. First a real depth frame is cropped centered on the center of mass. Subsequent frames are cropped using the key-points from the previous frame. Once the key-points for all frames has been inferred, each frame is cropped using its own key-points. The discriminator model is now trained using batches of both real and synthetic frames. The trained feature, pose, and discriminator layers are now trained together. This adversarial process resulting in domain specific features being suppressed by the feature extractor layers while maintaining a low synthetic pose estimation error. The model is now used again to infer key-point positions of real depth frames. The inferred key-point positions are used to initialize an iterative 3D model fitting GA. For each real depth frame that the GA converges, a pose label is obtained and added to a database. The real depth frames with labels that are stored in the database are used to continue training the model. During training, a small random offset is added to the ROI center before cropping and resampling.

The upper half 207 of FIG. 2 shows how the neural network blocks (feature extractor neural network 217, pose key-point estimator neural network 219, and discriminator 227) fit into the system during training.

Inverse Kinematic Model

The 3D model fitting algorithm requires a depth frame to be reconstructed from the input key-points. To do this, joint angles are estimated from key-points using an inverse kinematics (IK) algorithm. Once the angles are known, a synthetic hand can be rendered in the matching pose. Although possible to use trigonometry to compute angles, a neural network is used instead. One advantage of the neural network is that key-points need not be at the rotation point. This is disclosed in Richard Bellon. 2016. Model Based Augmentation and Testing of an Annotated Hand Pose Dataset, which states: "We paired the ICVL marker positions and LibHand angle vectors. We used these pairs for training a deep learning of architecture made of four dense layers and rectified linear units. 3D marker point positions of the fitted ICVL model served as the input and skeleton angles were the outputs during training."

Using a neural network for IK has a number of other advantages when the key-points do not exactly fit the forward kinematic model. Gaussian noise is added to the key-point positions generated by the forward kinematic model during training so that inverse kinematics inference performs well when key-points do not exactly fit the kinematic model.

FIG. 2 shows that the IK block (pose angle estimator (inverse kinematic model) 240) is trained using a forward kinematic model and used to provide a pose to the hand renderer generative error function 242.

Before key-point positions are input to the neural network, they are made invariant to hand position and orientation. The orientation expressed as a rotation matrix, $R_h = [\vec{u}_1, \vec{u}_2, \vec{u}_3] \in R^{3 \times 3}$, of a pose, expressed as key-points, is defined as:

$$\vec{u}_1 = \frac{\vec{y}_{mr} - \vec{y}_{wr}}{\|\vec{y}_{mr} - \vec{y}_{wr}\|_2}$$

$$\vec{u}_2 = \vec{u}_1 \times \frac{\vec{y}_{ir} - \vec{y}_{lr}}{\|\vec{y}_{ir} - \vec{y}_{lr}\|_2}$$

$$\vec{u}_3 = \vec{u}_1 \times \vec{u}_2$$

where $\vec{y}_{mr}$, $\vec{y}_{ir}$, $\hat{y}_{lr}$, and $\hat{y}_{wr}$ are the Cartesian coordinates of the key-points representing the middle finger root, index finger root, little finger root, and the wrist respectively.

The center $\vec{v}_h$ of a pose is defined as:

$$\vec{v}_h = \frac{\vec{y}_{ir} + \vec{y}_{mr} + \vec{y}_{rr} + \vec{y}_{lr}}{4}$$

where $\vec{y}_{rr}$ is the coordinate of the key-point representing the ring finger root. The hand center is subtracted from the key-points, before rotating to a constant orientation. Next, the normalized key points for each finger and the wrist are input to separate dense neural networks that compute the angles of the joints as quaternions. The neural networks are trained using a forward kinematic model in randomly generated poses. The Adam optimizer is used. Once the joint angles have been computed by the neural network, the forward kinematic model is used to compute key-point positions of the synthetic hand. The transformation to set to the orientation and center of the synthetic hand to match the input key-points is then computed and applied. Using the synthetic hand, a synthetic frame can now be rendered.

Iterative Hand Pose Optimization

The iterative 3D model fitting process attempts to minimize the error between the pose of a synthetic hand model and the real depth frame. Either the joint angles, or key-point positions can be optimized. It is thought that optimizing the key-point positions before the IK has the advantage that the parameters more separately affect the pose error, therefore making convergence to a good pose more likely. Unlike David Joseph Tan, Fits Like a Glove, which attempts to estimate gradients, a gradient free heuristic optimization algorithm is used. A GA is used to find a set of key-points that minimize the pose error. FIG. 2 shows the GA block as the heuristic hand pose optimization (genetic algorithm) 238.

The pose error is defined as the error of a rendered frame of a pose computed using the inverse kinematics described above. The error of rendered frame $A \in R^{N \times M}$ given a real frame $B \in R^{N \times M}$ is defined as:

$$E_r(A, B) = \frac{\sum_{i=0}^{N-1} \sum_{j=0}^{M-1} m(A_{i,j}, B_{i,j}) f(|A_{i,j} - B_{i,j}|)}{\sum_{i=0}^{N} \sum_{j=0}^{M} m(A_{i,j}, B_{i,j})}$$

where f(x) is defined as:

$$f(x) = \begin{cases} x & x < a \\ b & \text{otherwise} \end{cases}$$

and the masking function, m(x, y), is defined as:

$$m(x, y) = \begin{cases} 1 & c < x < d \text{ and } c < y < d \\ 0 & \text{otherwise} \end{cases}$$

The GA is initialized by sampling from the pose estimation CNN. There are a number of ways to obtain a distribution from a regression neural network. For example, Gal, Ghahramani, 2015, Dropout as a Bayesian Approximation Representing Model Uncertainty in Deep Learning, uses Dropout at training and inference time to obtain a distribution. ("In this paper we develop a new theoretical framework casting dropout training in deep neural networks (NNs) as approximate Bayesian inference in deep Gaussian processes.")

It was found that it was difficult not to over regularize with Dropout in a CNN, therefore for this work Gaussian noise was injected at multiple layers after Batch Normalization to obtain samples of pose key-points. Variation to the key-point pose output of the neural network is also added by adding a Gaussian random variable to the hand center that is obtained from the previous input to the model with the same depth frame when centering on ROI. First the population of poses is scored using the error function, Er(A, B), the top scoring poses are used to generate the next generation of poses: In the next generation, the top scoring poses are kept, key-points as a result of the inverse and then forward kinematic operations are added to force key-points onto the hand kinematic constraints, crossover is applied between pairs of poses by randomly selecting key-points from each, and new poses are sampled from the CNN using the new best hand center.

Figure 4:
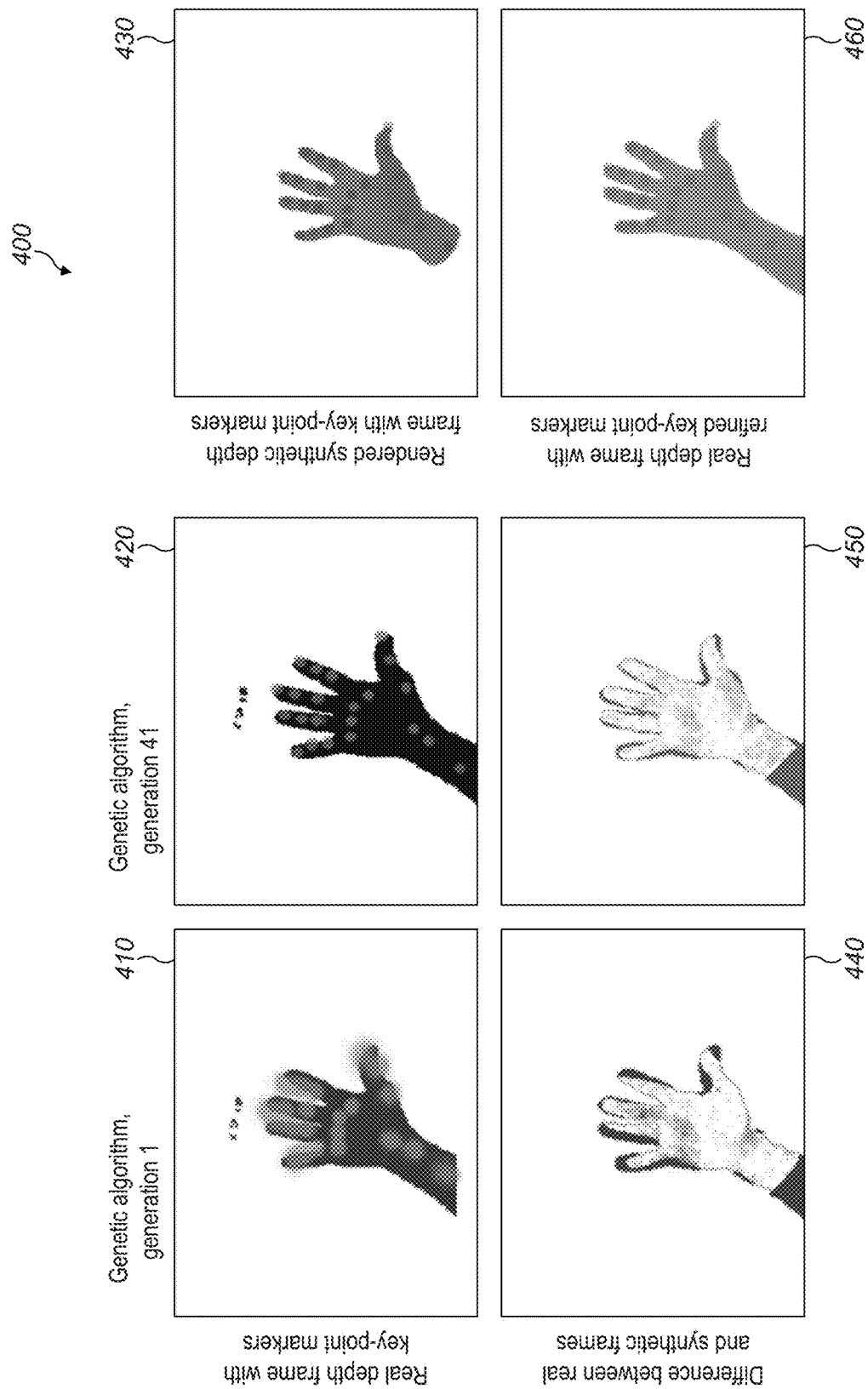
FIG. 4 shows a genetic algorithm converging to a good pose after 41 generations.

The GA is repeated for a fixed number of iterations. FIG. 4 shows the GA converging to a good pose after 41 generations. The pose cost evaluation is computed on the GPU without copying the rendered synthetic frame using an OpenGL to CUDA interop and sharing texture memory. To determine if the GA has converged, a more expensive fit evaluation is run on the CPU using a number of metrics including the difference in the signed distance function of the synthetic and real pose. If the pose has converged, the key-point labels are added to the real depth frame database that is used to train the feature extractor and pose estimation CNNs.

Turning to FIG. 4, shown is a schematic 400 where a population of pose key-point markers is initialized by sampling from the CNN 410 with a real depth frame input. The GA iteratively improves the fit of the pose 420 (here, after 41 generations). Also shown is the difference between the rendered synthetic frame and the real frame for the best fit pose in the population at generation 1 440, and at generation 41 450. Also shown is the refined rendered synthetic depth frame with key-point markers 430, and a real depth frame with the refined key-point markers 460.

Figure 5:
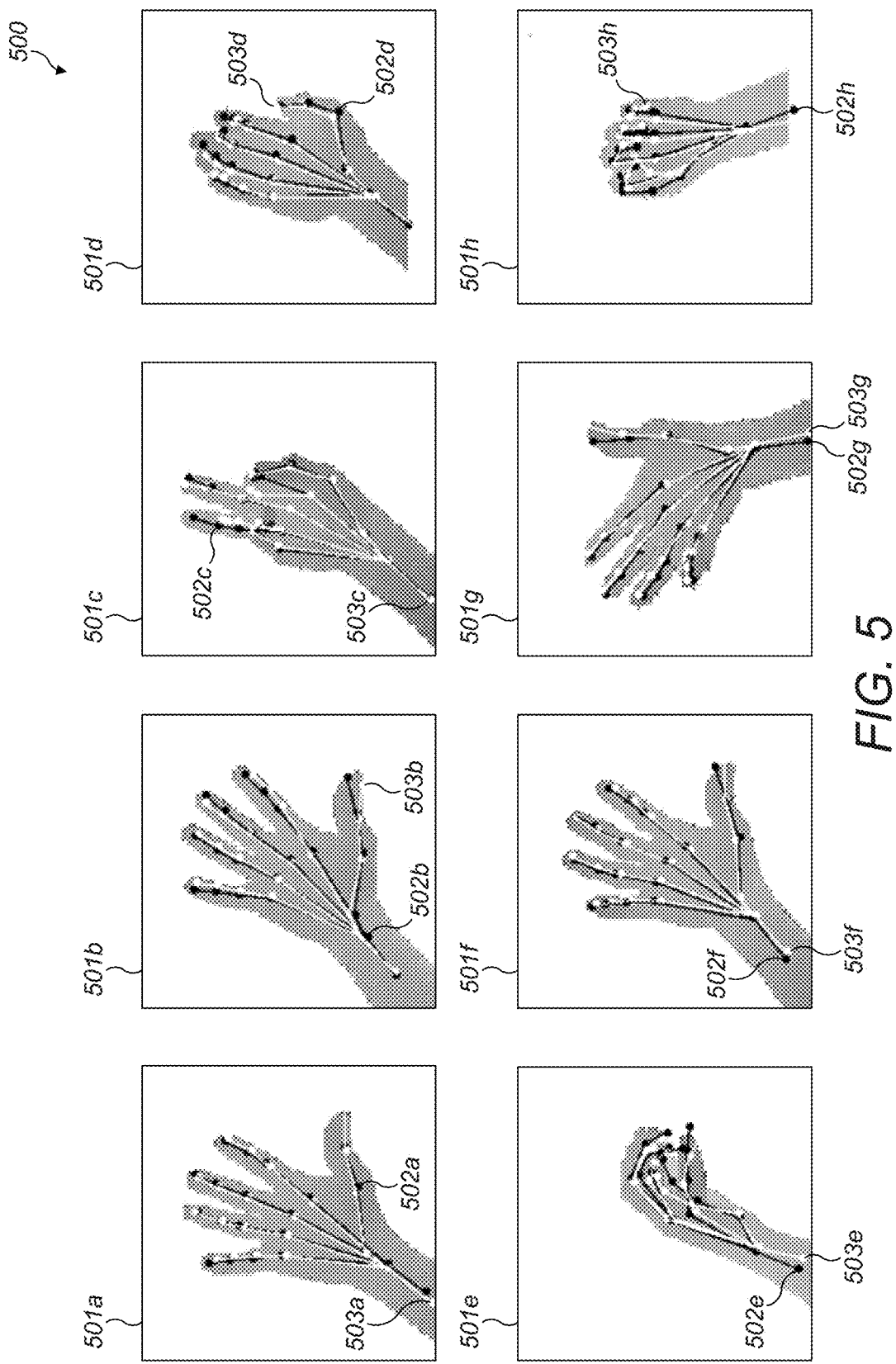
FIG. 5 shows a random sample of real frames cropped on ROI.
Figure 5:
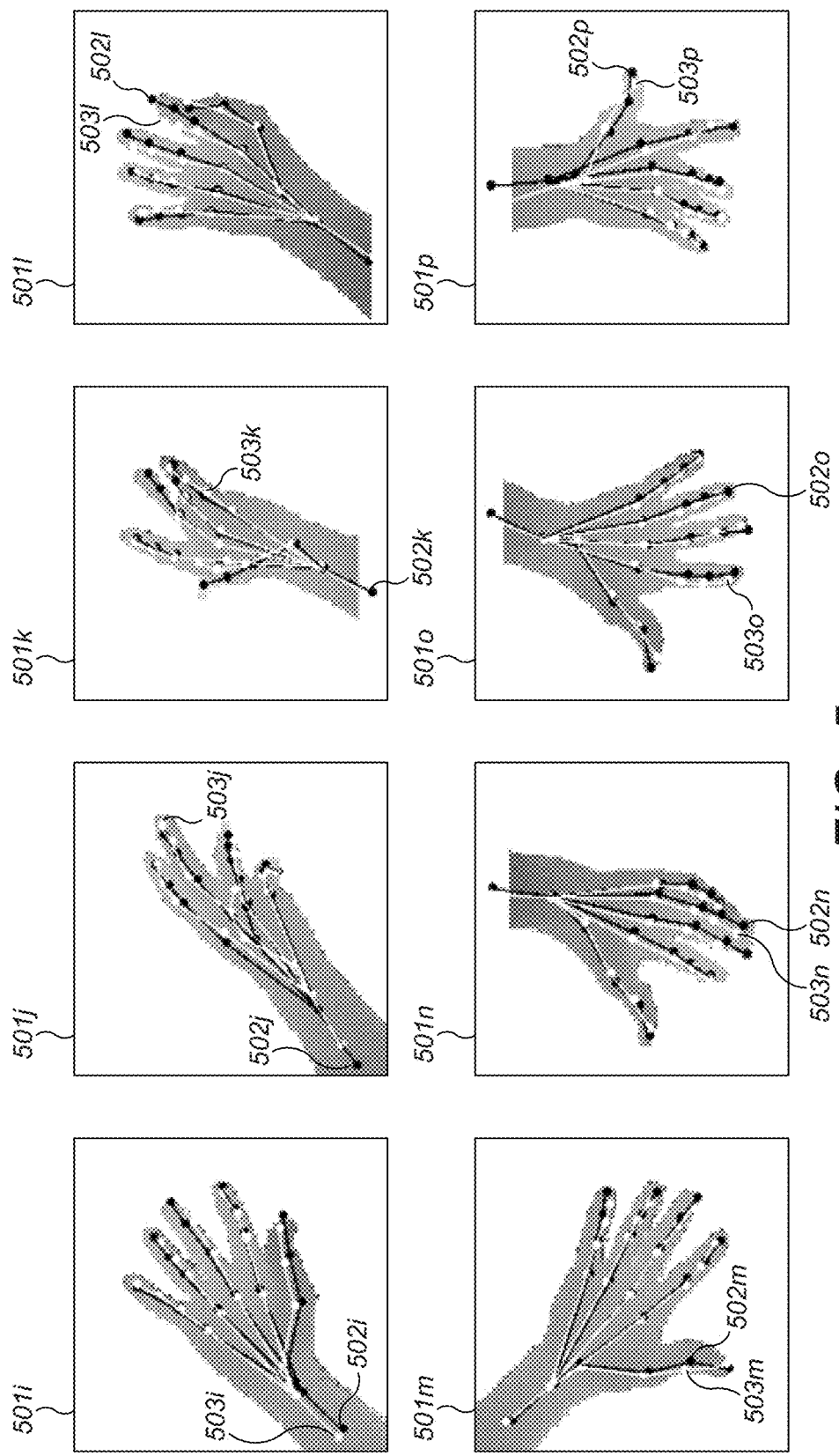

Turning to FIG. 5, shown is that the error in the pose estimated from both the genetic algorithm and the CNN is low after the training process. FIG. 5 shows a random sample real frames 501a-501p cropped on ROI. Black markers 502a-502p show key-points from a synthetic hand that has been iteratively fitted to the real frame using the GA. White markers 503a-503p show the key-points inferred from the depth frame by the CNN. The error between the black markers 502a-502p and white markers 502a-502p is quite small.

Future Applications

In the future, it may be possible to combine this technique with a much faster iterative 3D model fitting algorithm that is able to run real-time to further increase accuracy at the cost higher compute requirements. Alternatively, it may be possible to use the large CNN and automatically labeled dataset to train a simpler model, such as a smaller CNN or random forest that is less computationally expensive at the trade-off of accuracy. It is also possible to extend this method to other sensor types by simulating the forward function that maps from pose to sensor output, in the same way that a synthetic depth frame can be rendered from a pose to simulate the forward function of a depth camera.

Additional Disclosure

Additional disclosure is as follows:

1. An algorithm for CNN domain adaptation to an unlabeled target domain by using a GA to refine inferred target domain labels. A feedback loop is introduced where; the CNN infers key-point labels, the key-point labels are refined using a GA, the refined labels are used to update CNN weights using backpropagation.

2. Using an inverse kinematics neural network, trained using a forward kinematic model with Gaussian noise added to key-point positions, as part of an iterative 3D model fitting algorithm.

3. Using global average pooling in the domain discriminator so that only small-scale domain-invariant features are learned. This allows successful domain adaptation when source domain and target domain pose distributions don't match.

CONCLUSION

While the foregoing descriptions disclose specific values, any other specific values may be used to achieve similar results. Further, the various features of the foregoing embodiments may be selected and combined to produce numerous variations of improved haptic systems.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

I claim:

1. A method comprising:
   training a first neural network using samples from a source domain;
   implementing domain adaptation of the first neural network from the source domain to a target domain where labels are not available, comprising a feedback loop whereby:
   a) the first neural network infers labels for target domain samples;
   b) the labels for the target domain samples are refined using a generative iterative model fitting process to produce refined labels for the target domain; and
   c) the refined labels for the target domain are used for training of the first neural network using backpropagation of errors; and
   using a second neural network for inverse kinematics that is used as part of the generative iterative model fitting process.

2. The method as in claim 1, wherein the generative iterative model fitting process attempts to minimize error between pixels in a synthetic frame and a real frame as the synthetic frames are generated using a computer graphics rendering technique.

3. The method as in claim 1, wherein the generative iterative model fitting process uses a genetic algorithm.

4. The method as in claim 1, wherein the source domain samples are generated using a computer graphics rendering technique.

5. The method as in claim 1, wherein the target domain samples are generated using a camera.

6. The method as in claim 1, further comprising:
   optimizing the first neural network to minimize key-point error from frames for which key-point labels are known.

7. The method as in claim 6, further comprising:
   cropping and resampling frames so that they are centered and have a normalized scale in pixels.

8. The method as in claim 6, wherein the first neural network is also trained using unlabeled target domain samples, and wherein a domain discriminator neural network and an adversarial loss is used to learn domain invariant features.

9. The method as in claim 3, further comprising:
   using the first neural network with injected noise to generate a pose ensemble for each real depth frame.

10. The method as in claim 9, further comprising:
    using the pose ensemble to initialize a genetic algorithm.

11. The method as in claim 1, further comprising:
    using a forward kinematics model and random pose generator to generate a labeled dataset that is used for training of the second neural network.

12. The method as in claim 1, further comprising:
    using a separate dense neural network for each finger.

13. The method as in claim 4, further comprising:
    using a random pose generator to set a pose of a 3D model for each sample in a synthetic source domain dataset.

14. The method as in claim 12, further comprising:
    adding Gaussian noise to pose key-point inputs while training the second neural network.

15. The method as in claim 8, wherein the domain discriminator neural network uses global average pooling so that only small-scale domain-invariant features are learned.

16. A method comprising:
    training a first neural network using samples from a source domain;
    implementing domain adaptation of the first neural network from the source domain to a target domain where labels are not available, comprising a feedback loop whereby:
    a) the first neural network infers labels for target domain samples;
    b) the labels for the target domain samples are refined using a generative iterative model fitting process to produce refined labels for the target domain; and
    c) the refined labels for the target domain are used for training of the first neural network using backpropagation of errors; and
    using a second neural network that is used as part of the generative iterative model fitting process.

17. The method as in claim 16, wherein the generative iterative model fitting process attempts to minimize error between pixels in a synthetic frame and a real frame as the synthetic frames are generated using a computer graphics rendering technique.

18. The method as in claim 16, wherein the generative iterative model fitting process uses a genetic algorithm.

19. The method as in claim 16, wherein the source domain samples are generated using a computer graphics rendering technique.

20. The method as in claim 16, wherein the target domain samples are generated using a camera.

21. The method as in claim 16, further comprising:
optimizing the first neural network to minimize key-point error from frames for which key-point labels are known.

22. The method as in claim 21, further comprising:
cropping and resampling frames so that they are centered and have a normalized scale in pixels.

23. The method as in claim 21, wherein the first neural network is also trained using unlabeled target domain samples, and wherein a domain discriminator neural network and an adversarial loss is used to learn domain invariant features.

24. The method as in claim 18, further comprising:
using the first neural network with injected noise to generate a pose ensemble for each real depth frame.

25. The method as in claim 24, further comprising:
using the pose ensemble to initialize a genetic algorithm.

26. The method as in claim 16, further comprising:
using a forward kinematics model and random pose generator to generate a labeled dataset that is used for training of the second neural network.

27. The method as in claim 16, further comprising:
using a separate dense neural network for each finger.

28. The method as in claim 19, further comprising:
using a random pose generator to set a pose of a 3D model for each sample in a synthetic source domain dataset.

29. The method as in claim 27, further comprising:
adding Gaussian noise to pose key-point inputs while training the second neural network.

30. The method as in claim 23, wherein the domain discriminator neural network uses global average pooling so that only small-scale domain-invariant features are learned.

* * * * *